(12) United States Patent
Ting et al.

(10) Patent No.: US 12,405,382 B1
(45) Date of Patent: Sep. 2, 2025

(54) PARTICULATE MATTER-OCCLUDED OBJECT PROBABILITY MAP FOR SENSOR RETURNS

(71) Applicant: Zoox, Inc., Foster City, CA (US)

(72) Inventors: Samantha Marie Ting, Redwood City, CA (US); Venkata Subrahmanyam Chandra Sekhar Chebiyyam, San Francisco, CA (US); Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 603 days.

(21) Appl. No.: 17/555,365

(22) Filed: Dec. 17, 2021

(51) Int. Cl.
| | |
|---|---|
| *G01S 17/931* | (2020.01) |
| *G01B 11/22* | (2006.01) |
| *G01S 7/481* | (2006.01) |
| *G01S 17/89* | (2020.01) |
| *G05B 13/02* | (2006.01) |
| *B60W 30/09* | (2012.01) |

(52) U.S. Cl.
CPC ............ *G01S 17/931* (2020.01); *G01B 11/22* (2013.01); *G01S 7/4814* (2013.01); *G01S 17/89* (2013.01); *G05B 13/0265* (2013.01); *B60W 30/09* (2013.01); *B60W 2420/408* (2024.01)

(58) Field of Classification Search
CPC ...... G01S 17/931; G01S 7/4814; G01S 17/89; G05B 13/0265; G01B 11/22; B60W 30/09; B60W 2420/408
USPC .......................................................... 701/26
See application file for complete search history.

(56) References Cited

U.S. PATENT DOCUMENTS

| | | | | |
|---|---|---|---|---|
| 2020/0210721 A1* | 7/2020 | Goel | ........................ | G06F 18/24 |
| 2020/0309957 A1* | 10/2020 | Bhaskaran | .............. | G01S 17/86 |

FOREIGN PATENT DOCUMENTS

| | | |
|---|---|---|
| WO | WO2022009707 | 1/2022 |

* cited by examiner

*Primary Examiner* — Isaac G Smith
(74) *Attorney, Agent, or Firm* — Lee & Hayes, P.C.

(57) ABSTRACT

A machine-learned (ML) model for determining, using at least depth data (e.g., lidar data, radar data), whether an object exists beyond particulate matter, such as dust, steam, smoke, rain, etc. from a sensor. Determining the likelihood may include determining a probability map that varies, distance beyond the particulate matter, reflectance of the object, transmit power, or the like.

20 Claims, 10 Drawing Sheets

PARTICULATE MATTER-OCCLUDED OBJECT PROBABILITY MAP FOR SENSOR RETURNS

BACKGROUND

Light detection and ranging or "lidar" refers to a technique for measuring distances to visible surfaces by emitting light and measuring properties of the reflections of the light. A lidar system has a light emitter and a light sensor. The light emitter may comprise a laser that directs light into an environment. When the emitted light is incident on a surface, a portion of the light is reflected and received by the light sensor, which converts light intensity to a corresponding electrical signal.

A lidar system has signal processing components that analyze reflected light signals to determine the distances to surfaces from which the emitted laser light has been reflected. For example, the system may measure the propagation time of a light signal as it travels from the laser emitter, to the surface, and back to the light sensor. A distance is then calculated based on the flight time and the known speed of light.

However, fine particulate matter may also reflect light. Problematically, fog, smoke, exhaust, steam, and other such vapors may reflect light emitted by a lidar system. The lidar system may accordingly produce a false positive indication of the existence of a surface at the location of the vapor, even though no solid exists at the location.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1A:
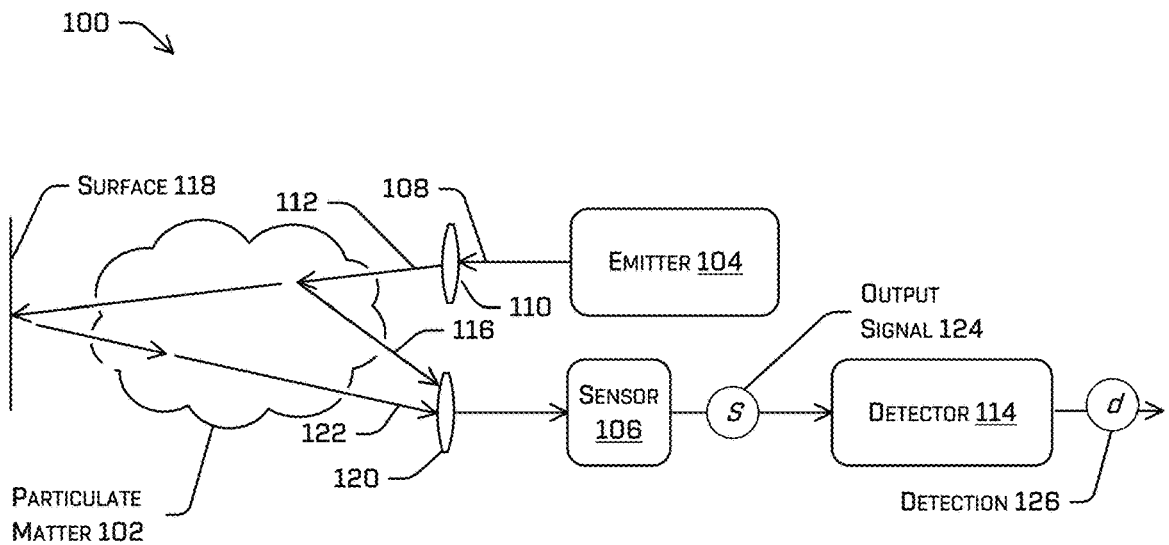
FIG. 1A illustrates a block diagram of components of an example lidar system, including reflected light attributable to particulate matter that may create a dual response and a channel comprising an emitter/sensor pair.

As discussed above, particulate matter through (e.g., fog, smoke, exhaust, rain, snow). may be particularly troublesome for lidar systems and may result in false positive indications that a surface exists. As used herein a false detection is a false positive indication that a surface exists in an environment surveyed by a light sensor such as, for example, a lidar device. The false detection may be caused by a false return, which may be a false positive indication that a portion of an output signal of a sensor is associated with a surface. A return may be a signal generated responsive to a reflection of light emitted by an emitter of the lidar (or other measurement) device. In some examples, a return may be a peak and/or other portion of a sensor signal that meets or exceeds a detection threshold. However, in at least some examples, such false positive indications may be associated with genuine returns but returns which have no impact on a solid object moving. In such examples, though, the returns correspond to real material, they are false in the sense that they should be ignored in certain contexts (e.g., driving).

Additionally, particulate matter and/or translucent materials, such as glass, may cause transmitted light to split into two (or more beams), which may result in multiple returns. This means that the lidar system may generate an indication that two (or more) surfaces exist at different depths but at substantially the same or the same two-dimensional location in the lidar scan grid. To further complicate this, these split returns, as they're called herein, cannot be dismissed outright because particulate matter isn't the only thing that generates split returns. Edges of various surfaces may also split beams and cause split returns. For example, an edge of a pedestrian or a vehicle may cause a transmitted beam to split, resulting in a split return. Furthermore, even if particulate matter is accurately detected and classified as being particulate matter, a vehicle, sensor, and/or human may not be able to see through particulate matter, which may present a safety risk to anyone or anything that is beyond the particulate matter and/or to a passenger of a vehicle. Particulate matter may thereby present a safety risk, even when the particulate matter is accurately identified.

The techniques discussed herein may mitigate or remedy these issues. For example, the techniques may include a first machine-learned (ML) model for classifying a split return as being associated with particulate matter or as being associated with a true positive surface. In some examples, if a single split return is detected, a system may determine whether more split returns are also present. If the system determines that a number of split returns are present that meets or exceeds a threshold number of split returns or that meets or exceeds a threshold density of split returns within a region, the system may provide the split returns in a region as input to the first ML model. The first ML model may include an edge detection and/or hollow shape classifier that may determine whether the set of split returns forms an edge or hollow shape, as a first classification, or a solid shape as a second classification. A set of split returns that forms an edge or hollow shape may be associated with an indication that the split returns are associated with a true positive surface; whereas, if the first ML model indicates that the split returns form a solid (non-hollow) shape, the split returns may be identified as being associated with particulate matter.

These techniques may be corroborated or augmented by using a second ML model (a computer vision model) to classify an image (e.g., visual light and/or thermal image) as including particulate matter or not and determining whether a split return is associated with a portion of the image classified as being associated with particulate matter. The image classification may include an instance segmentation, semantic segmentation, and/or region of interest (e.g., bounding box, mask). For example, the split returns may be projected from a lidar sensor frame and coordinate space into an image sensor frame and coordinate space. Once a split return has been projected into the image space, it may be determined whether the split return is within a portion of the image identified by the instance segmentation, semantic segmentation, and/or region of interest as being associated with particulate matter.

These techniques may be additionally or alternatively corroborated by determining a density of split returns within a region a density that does not meet a threshold density may be indicative of a true positive surface, whereas a density that meets or exceeds a density threshold may be associated with a false positive, such as particulate matter.

In some examples, these techniques may be combined. For example, a first stage may comprise the first ML model which may determine a first output (e.g., likelihood, logit) associated with a false positive indication (solid shape classification) and a second output (e.g., likelihood, logit) associated with a true positive indication (hollow shape or edge classification). A second stage may determine a density of the split returns and/or whether a split return is associated with a portion of an image classified as being associated with particulate matter. The second stage may scale the first output and/or the second output based at least in part on the determination(s) made at the second stage. For example, if, in the second stage, it is determined that one or more split returns are associated with a portion of an image classified as being associated with particulate matter, the first output may be increased by a scale defined by the number and/or density of split returns within the portion of the image identified as being associated with particulate matter and/or a confidence score associated with the image classification. Alternatively, if, in the second stage, it is determined that one or more split returns are associated with a portion of an image classified as being a pedestrian, vehicle, etc. the second output may be increased by the scale and/or the first output may be decreased by the scale. At a final stage, a normalization layer (e.g., a rectified linear unit ReLU, sine layer, tanh layer, etc.) may be applied as necessary, such as to normalize logits if the first and second output are in logit form. The final stage may also include a softmax or similar layer to determine whether the first output or second output is greater, after any scaling and/or normalization that may have been done. The output from this layer may be used as the final output. Of course, while discussed herein in as more than one machine-learned model, it should be understood that other techniques may be used (e.g., end-to-end training and the like) such that all determinations may be made by a single model and/or any other number. A planning component of an autonomous or semi-autonomous vehicle may control the vehicle based at least in part on this final output.

The techniques may additionally or alternatively include a third ML model or component that determines a likelihood that an object exists beyond particulate matter detected by the vehicle. The technique may additionally or alternatively include determining a probability map that may indicate a probability that an object is located beyond the particulate matter at a particular distance from the vehicle and based on a reflectivity of the object. Determining the likelihood that an object exists beyond the particulate matter may be based at least in part on a percentage of returns associated with the particulate matter that are split returns, a transmission power of a transmitted beam, and/or a distance to the object or a reflectivity (one of which may be held constant). In some examples, the ML model may output a probability distribution and/or probability map identifying probabilities at different respective differences and/or reflectivities. For example, the ML model may output multiple probability maps where each probability map is associated with a different object reflectivity. In some examples, an assumed reflectivity may be selected to be in a range associated with skin, clothing, fur, or the like. In some examples, the probability map may be further based at least in part on a diffusion associated with an object material. A planning component of an autonomous or semi-autonomous vehicle may use the probability and/or probability map do determine how to control the vehicle.

Once the lidar system identifies a false return (i.e., a return associated with particulate matter), the techniques may include suppressing the false return from being identified as a detection. This suppression may be accomplished by preventing the lidar system from positively identifying the detection as a true positive detection. Preventing the lidar system from identifying the detection as a genuine detection may include increasing a detection threshold by a static amount, increasing the detection threshold detection by an amount determined based at least in part on the output signal of the first channel and/or the second channel, increasing the detection threshold for the portion of the output signal corresponding to the detection, increasing the detection threshold for one or both channels, providing a flag to associate the data with particulate matter, and/or discarding the output signal. For example, the lidar system may be configured to output, as a positive detection, a distance measurement and/or angle associated with portion(s) of an output signal that meet or exceed the detection threshold. In some examples, the lidar system may preliminarily identify, as a return, any portion of an output signal that meets or exceeds the detection threshold. However, the lidar system may prevent suppression of a split return that is determined to be associated with a solid surface, according to the techniques discussed herein.

Similarly, a false detection that was not suppressed by the lidar system may be suppressed by a downstream component of the perception component based at least in part on determining that a detection is a false detection. In some examples, this may comprise deleting (e.g., disregarding) the false detection and/or setting a new value for the false detection. In at least some examples, such measurements may not be suppressed, but otherwise associated with an uncertainty (or certainty/probability) that the return is associated with fog, exhaust, steam, or otherwise. As such, a planning component (e.g., of a robotic platform) may discount, or otherwise account for, such points.

The techniques discussed herein may improve the accuracy of lidar detections by reducing the number of false positives generated by a lidar device and/or the number of false detections appearing in a depth map generated based at least in part on lidar data. Moreover, the techniques may enable a lidar system to identify which of two or more returns is associated with a solid surface and ensure that split returns associated with sold surfaces aren't suppressed. The techniques may also improve the safety of a vehicle by increasing the vehicle's ability to detect whether an object might be occluded by particulate matter. The techniques discussed herein may accordingly improve the safety and accuracy of operation of systems that rely on detections generated by a lidar device.

Example Lidar System

FIG. 1A illustrates a block diagram of components of an example lidar system 100 that may comprise one or more channels and suppress false detections (or otherwise provide associated probabilities of being associated with particulate matter returns). The depicted example illustrates an example scenario in which particulate matter 102 may interfere with operation of a channel the lidar system 100.

The example lidar system 100 in FIG. 1A depicts a single channel, although the example lidar system 100 may comprise any number of channels. A channel may be used to emit a laser light pulse and to measure properties of the reflections of the pulse, as explained below, and may comprise at least an emitter-sensor pair, such as, for example, emitter 104 and corresponding sensor 106. One skilled in the art would understand that the light emitters and light sensors may be multiplied in number beyond the single laser emitter and light sensor depicted. For example, a first channel may measure a distance to any detectable surface in a first direction of an environment surrounding the example lidar system 100, whereas a second channel may measure a distance to any detectable surface in a second direction, where the first direction and the second direction are separated by three to five degrees, for example. The term "channel" may also encompass supporting circuitry that is associated with the emitter/sensor pair and at least some of the supporting circuitry may be shared among multiple channels (e.g., detector(s), digital-to-analog converter (DAC), analog-to-digital converter (ADC)). However, the techniques discussed herein may be applied to flash lidar, which may not have discrete channels and may, instead, have one or more detectors that are not specifically associated with a particular emitter. In some examples, adjacent channels of example lidar system 100 may be disposed within a housing of the example lidar system 100 to emit light and/or receive light along different azimuths and/or altitudes. Note, also, that although FIG. 1A depicts a lidar system, the techniques discussed herein may additionally or alternatively applied to a time of flight (ToF) system, a RADAR system, etc.

In some examples, emitter 104 may include a laser emitter that produces light of a wavelength between 600 and 1000 nanometers. In additional or alternate examples, the wavelength of emitted light may range between 10 micrometers to 250 nm. The emitter 104 may emit light (e.g., laser pulses) that varies in power and/or wavelength. For example, some of the laser emitters of the example lidar system 100 may emit light at a 905 nanometers, and others of the laser emitters may emit light at 1064 nanometers. The laser emitters of the different wavelengths can then be used alternately, so that the emitted light alternates between 905 nanometers and 1064 nanometers. The sensor 106 may be similarly configured to be sensitive to the respective wavelengths and to filter other wavelengths.

Activating or turning on an emitter may be referred to as "firing" the emitter (i.e., causing the emitter to emit light). In some examples, the emitter 104 may be fired to create a light pulse having a short duration. Moreover, to conserve power, the example lidar system 100 may decrease the power of the emitted light pulse based, at least in part, on detected conditions of the environment into which the light pulse is to be emitted (e.g., low light/low noise conditions). In some examples, the emitter 104 may be driven to output a pseudorandom noise (PN) sequence and/or other code. For example, each emitter of the lidar system 100 may output a difference PN sequence to differentiate between returns.

For a single distance measurement via the depicted channel, emitter 104 may be controlled to emit a burst of light pulses 108 (i.e., one or more) through a lens 110 as emitted pulse 112 and the corresponding sensor 106 may be powered on and/or otherwise allowed to pass a signal generated by the sensor 106 to detector 114. In some examples, the detector 114 may read a signal generated by the sensor 106 by opening a switch corresponding to the sensor 106. A sensor is considered "active," according to the discussion herein, when the signal output by a sensor is being read by the detector 114 and/or otherwise being relied on to determine whether or not the output signal indicates the existence of a surface.

In the example scenario, the emitted pulse 112 may be partially or completely reflected by particulate matter 102 as reflection 116 (also referred to herein as reflected light). For example, particulate matter 102 may comprise water particles and/or droplets, dust particles, vehicle emissions, smoke particles, etc. In some cases, part of the emitted pulse 112 may, in some cases and depending on the density and/or type of the particulate matter 102, pass through the particulate matter 102, and be reflected by a surface 118 behind the particulate matter 102 along an azimuth associated with the channel, which is depicted in FIG. 1A as reflection 122. In some examples, all or part of reflection 122 may pass through the particulate matter 102 on a return path and be received at sensor 106. The reflection 116 may pass through a lens 120 to sensor 106.

In some examples, the lens 110 and the lens 120 may be the same lens, depicted redundantly for clarity. In some examples, the lidar may include multiple laser emitters positioned within a chassis to project laser light outward through the one or more lenses. In some examples, the lidar may also include multiple light sensors so that light from any particular emitter is reflected through the one or more lenses to a corresponding light sensor. In other examples, the lens 120 may be a second lens designed so that beams from different emitters at different physical positions within a housing of the lidar are directed outwardly at different angles. Specifically, the lens 110 may be designed to direct light from the emitter of a particular channel (e.g., emitter 104) in a corresponding and unique direction. The lens 120 may be designed so that the corresponding sensor (e.g., sensor 106) of the channel receives reflected light from the same unique direction to disambiguate between light received through the lens 120 that is attributable to reflections of light emitted by other emitter(s).

In some examples, the sensor 106 may comprise a photomultiplier (e.g., silicon photomultiplier (SiPM)), photodiode (e.g., avalanche photodiode (APD), single-photon avalanche diode (SPAD)), and/or other device that converts light intensity at the sensor to a corresponding electrical signal (output signal 124). A portion of the output signal 124 generated by the sensor 106 may be attributable to the reflection 116 and/or 122. This portion of the output signal 124 may be termed a "return" and/or "return signal." Where the output signal 124 comprises a portion attributable to a reflection off the surface 118 and the particulate matter 102, the output signal would be said to comprise two (or more) returns (e.g., two portions of the output signal that have an amplitude and/or power that meet or exceed a detection threshold), called a split return herein.

A return signal attributable to reflection off a surface 118 (without any interference from particulate matter 102) may generally be of the same shape as the light pulse 108 emitted by the emitter 104, although it may differ to some extent as a result of noise, interference, cross-talk between different emitter/sensor pairs, reflectivity of the surface 118 (e.g., whether the surface is L'Ambertian, retroreflective, etc.), diffusion, an angle of the surface 118, interfering signals, and so forth. The return signal will also be delayed with respect to the light pulse 108 by an amount corresponding to the round-trip propagation time of the emitted laser burst (i.e., the time delay of arrival). However, the return signal attributable to reflection of particulate matter 102 may not share the shape of light pulse 108.

In some examples, the detector 114 may read the output signal(s) generated by the sensor(s) of any currently active channels to determine whether any of the output signal(s) include a return signal (e.g., output signal 124 of sensor 106). For example, the detector 114 may determine whether an amplitude, energy, trigger event count (e.g., every instance an avalanche is triggered at a SPAD), and/or any other indication of a reception of a reflection of light emitted by an emitter of a channel, satisfies a detection threshold (e.g., meets or exceeds a detection threshold in amps, in Joules, arbitrary number (e.g., a number of counts, or units, as output from an ADC). For example, if the sensor 106 is active, the detector 114 may monitor the output signal 124 of the sensor 106 to determine whether an amplitude of the output signal 124 meets or exceeds the detection threshold. If a portion of the output signal 124 meets or exceeds the detection threshold, the detector 114 may indicate that portion as being a return signal and/or may output a detection 126. For example, the detector 114 may determine a time delay of arrival between emission of the light pulse 108 and receiving the reflected light pulse at the sensor 106 (i.e., as indicated by a relative time of the return signal) and/or a distance measurement corresponding to the time delay of arrival. In some examples, the detection 126 may comprise a distance measurement and/or a spatial position (e.g., a position within a depth map and/or voxel representation).

The detector 114 may be implemented in part by a field-programmable gate array ("FPGA"), an application-specific integrated circuit (ASIC), a microcontroller, a microprocessor, a digital signal processor ("DSP"), and/or a combination of one or more of these and/or other control and processing elements, and may have associated memory for storing associated programs and data.

Without implementing the techniques discussed herein, the detection 126 may be a false detection (i.e., a false positive indication of the existence and/or position of a surface in an environment surrounding the example lidar system 100) if the detection 126 indicates a position of the particulate matter 102. Moreover, a naïve system that does not implement the techniques discussed herein may incorrectly suppress the detection 126 if the detection 126 is based on a split return, since split returns may frequently be associated with particulate matter. The techniques discussed herein may comprise techniques for determining whether a split return is associated with a solid surface and suppressing false detections at the detector 114 and/or techniques for identifying and suppressing false detections at a component downstream from the detector 114 such as, for example, a device that receives output from the example lidar system 100 (e.g., a computing device of an autonomous vehicle and/or a component thereof such as, for example, a perception component). In at least some examples, a detection 126 may not be suppressed, but otherwise associated with an uncertainty (or certainty/probability) that the return is associated with fog, exhaust, steam, or otherwise. As such, a planning component (e.g., of a robotic platform) may discount, or otherwise account for, such detections.

Example Scenario

Figure 1B:
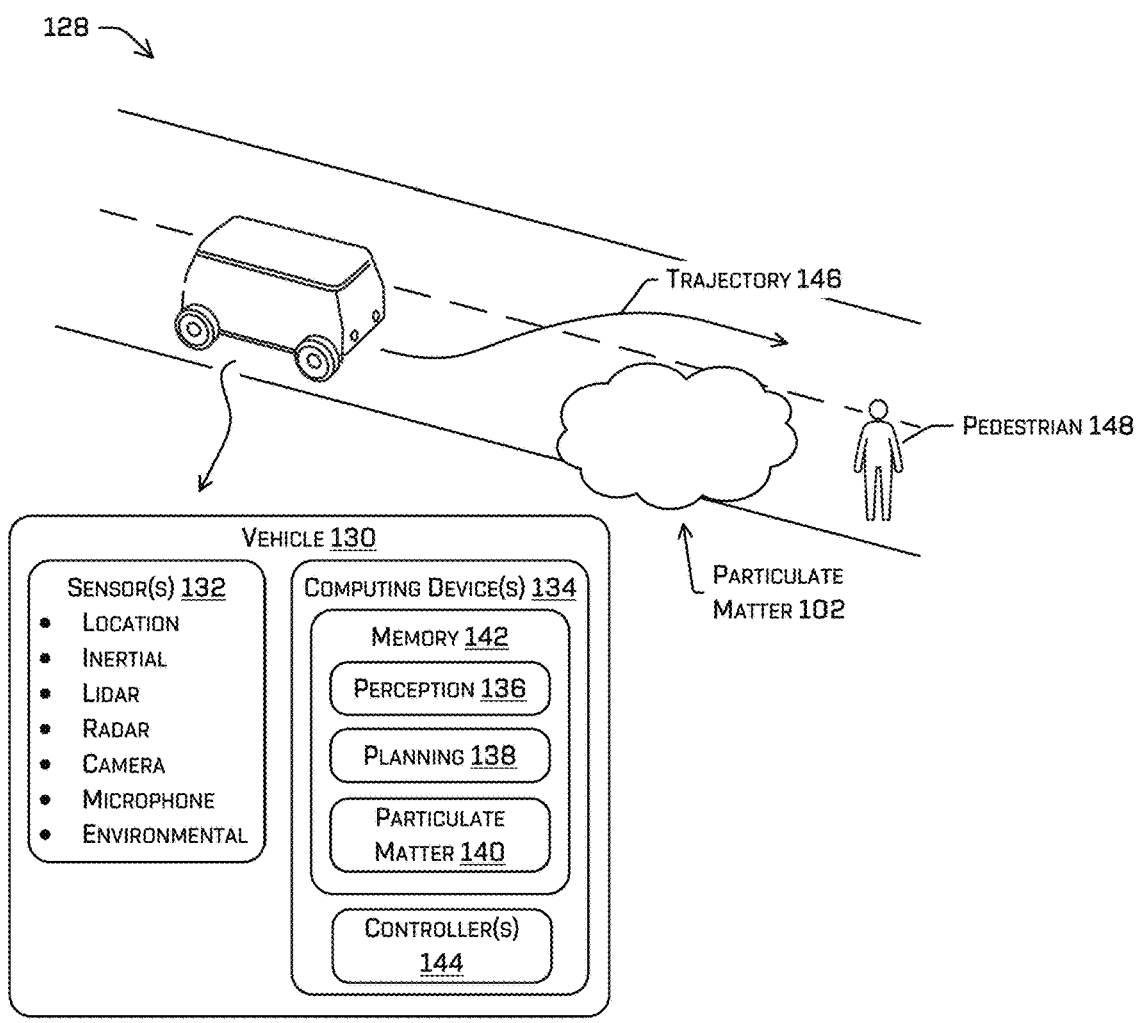
FIG. 1B illustrates an example scenario depicting an autonomous vehicle coming upon particulate matter and the potential effect caused by false detections when a pedestrian is behind the particulate matter.

FIG. 1B illustrates an example scenario 128 in which false detections may deleteriously affect the operation of a machine that relies on the accuracy of lidar detections, such as a vehicle 130. In some instances, the vehicle 130 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 130 may be a fully or partially autonomous vehicle having any other level or classification. Moreover, in some instances, the guidance isolation techniques described herein may be usable by non-autonomous vehicles as well. It is contemplated that the techniques discussed herein may apply to more than robotic control, such as for autonomous vehicles. For example, the techniques discussed herein may be applied to mapping, manufacturing, augmented reality, etc.

According to the techniques discussed herein, the vehicle 130 may receive sensor data from sensor(s) 132 of the vehicle 130. For example, the sensor(s) 132 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a visual light camera, a thermal imaging camera), an audio sensor (e.g., a microphone), and/or environmental sensor (e.g., a barometer, a hygrometer, etc.).

In some examples, the autonomous vehicle may include computing device(s) 134 that executes a perception component 136, a planning component 138, and/or a particulate matter component 140 stored on a memory 142. The computing device(s) 134 may further include one or more controllers, controller(s) 144 that generate instructions for actuating a drive system of the vehicle 130 to track a trajectory 146 generated by the planning component 138. The perception component 136, the planning component 138, and/or particulate matter component 140 may include one or more machine-learned (ML) models and/or other computer-executable instructions. In some examples, the controller(s) 144 may include instructions stored in a memory, although the controller(s) 144 may additionally or alternatively include a specialized computing device that comprises hardware and/or software for actuating drive components of the vehicle 130.

In general, the perception component 136 may determine what is in the environment surrounding the vehicle 130 and the planning component 138 may determine how to operate the vehicle 130 according to information received from the perception component 136. The perception component 136 may generate perception data, which may comprise data associated with static objects in the environment (static data) and/or data associated with dynamic objects in the environment (dynamic data). For example, the static data may indicate a likelihood that an object exists at a location in the environment and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). For example, the dynamic data may indicate a current position, heading, velocity, and/or the like associated with a dynamic object and at one or more future times.

The perception component 136 may additionally or alternatively determine an object classification associated with an object. An object classification may distinguish between different object types such as, for example, a passenger vehicle, a pedestrian, a bicyclist, a delivery truck, a semi-truck, traffic signage, and/or the like. The perception component 136 may additionally or alternatively determine a track associated with an object, which may comprise a historical, current, and/or predicted object position, velocity, acceleration, and/or heading. The track may additionally or alternatively associate sensor data or object detections from different times with a same object. In other words, the track may identify different object detections in time as being a associated with a same object.

The perception component 136 may additionally or alternatively comprise a prediction component that determines an estimate of a future action and/or movement (i.e., a prediction) that a dynamic object may take based at least in part on sensor data (which may comprise lidar data). In some examples, the prediction may be based at least in part on a mode of operation and/or trajectory of the vehicle. For example, the dynamic data may comprise a first prediction associated with a first vehicle mode and a first time and a second prediction associated with a second vehicle mode and the first time. The vehicle modes may include mission-level modes, such as passenger pickup, passenger transit, passenger deliver, or the like; path or trajectory-level modes such as maintaining trajectory, slowing to a stop, transitioning lanes, executing a righthand turn, or the like; and/or signal modes, such as activating a speaker, activating a turn light, flashing headlights or high beams, or the like. The autonomous vehicle's behavior and signals may affect decisions and behavior made by other entities in the vicinity of the autonomous vehicle 130 and may thereby affect the predicted motion of other objects.

In some examples, the perception component 136 may receive sensor data from the sensor(s) 132 and determine data related to objects in the vicinity of the vehicle 130 (perception data), such as the static and/or dynamic data, which may include prediction data related thereto. The perception data may include the static and/or dynamic data, a heat map (which may indicate a confidence indicating that a classification is correct and/or an indication that an object or object of a specific classification is occupying or will occupy a discrete portion of the environment, for example), object classifications associated with detected objects, instance segmentation(s), semantic segmentation(s), two and/or three-dimensional bounding boxes, tracks, etc.

For example, the perception component 136 may include a computer vision ML model configured to receive sensor data, such as visual light images and/or thermal images, and classifying a portion of such an image as being associated with particulate matter 102. Additionally or alternatively, the perception component 136 may include an ML model configured to receive sensor data, such as lidar and/or radar data, and determine that a portion thereof is associated with particulate matter 102. See U.S. patent application Ser. No. 16/851,033 filed Apr. 16, 2020, the entirety of which is incorporated herein by reference.

Figure 2A:
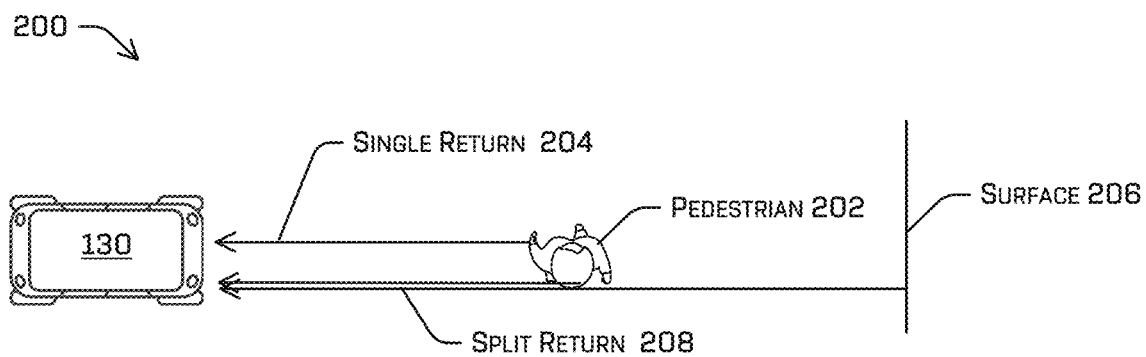
FIGS. 2A and 2B illustrate two different instances where a transmitted beam may be split, resulting in a split return or dual return.
Figure 5:
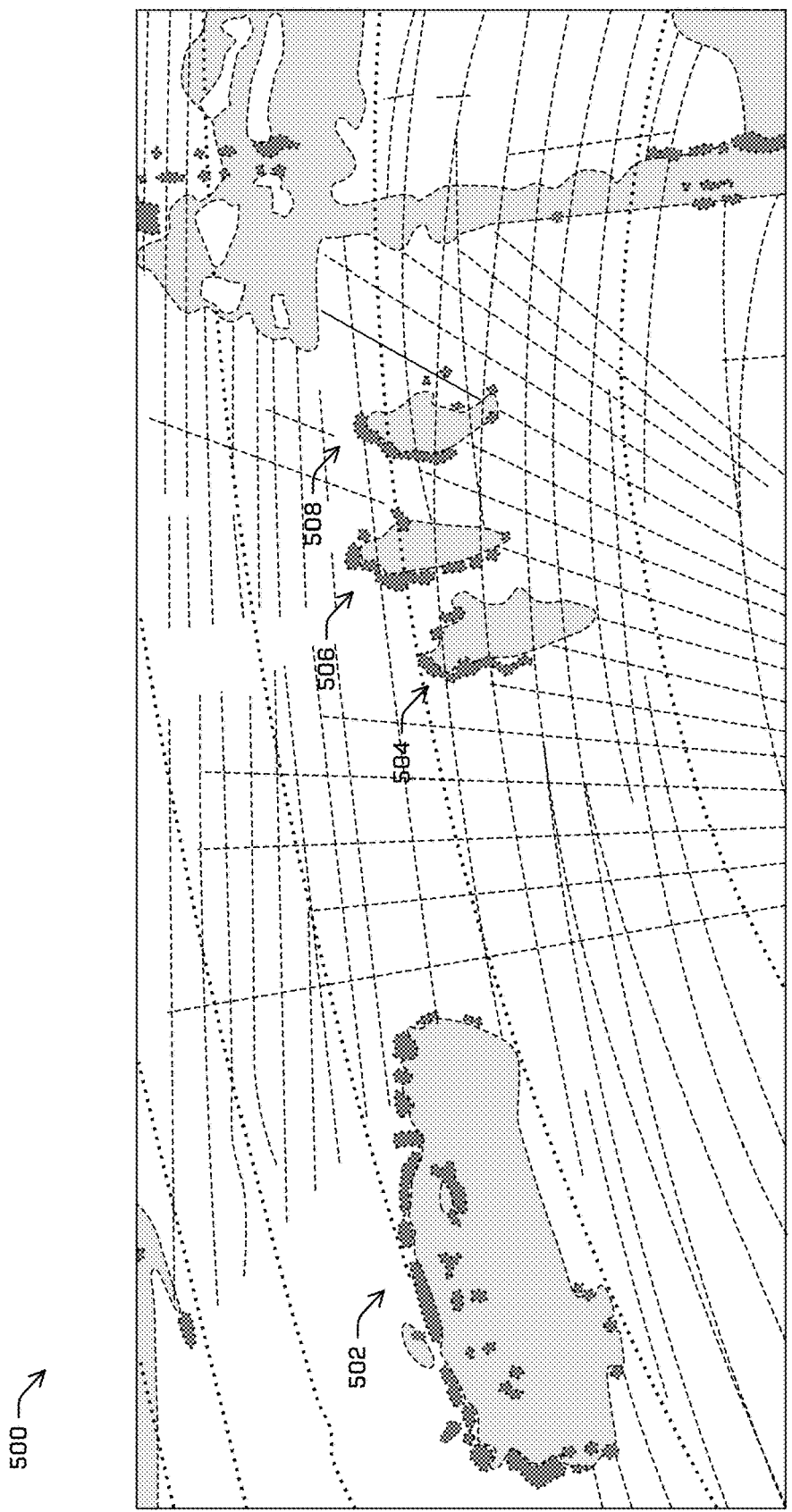
FIG. 5 illustrates returns associated with various objects, including split returns (illustrated in dark gray) at the object edges.

In some examples, the particulate matter component 140 may be part of the perception component 136. For example, the particulate matter component 140 may receive sensor data and determine that at least a portion of the sensor data includes one or more split returns. In such an example, the sensor data may include lidar data. The particulate matter component 140 may comprise one or more ML models and/or ML model pipelines for (1) determining that a split return is associated with particulate matter 102; (2) determining that a split return is associated with a solid surface (e.g., such as depicted at FIG. 2A and FIG. 5); and/or (3) determining a likelihood that an object, such as pedestrian 148, exists behind particulate matter 102.

In some examples, the perception component 136 and/or particulate matter component 140 may comprise a pipeline of hardware and/or software, which may include one or more GPU(s), ML model(s), Kalman filter(s), and/or the like. In some examples, the perception component 136 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. The perception component 136 may be configured to detect as many objects and information about the environment as possible to avoid failing to account for an event or object behavior that should be taken into account by the planning component 138 in determining a trajectory for controlling motion of the vehicle.

The data produced by the perception component 136 may be collectively referred to as perception data. Once/as the perception component 136 generates perception data, the perception component 136 may provide the perception data to the planning component 138. In some examples, perception data may comprise outputs of sensor specific pipelines (e.g., vision, lidar, radar) and/or hybrid sensor pipelines (e.g. vision-lidar, radar-lidar). In some instances, the perception data may be based at least in part on lidar data received from a lidar device of the sensor(s) 132. The particulate matter component 140 may output a likelihood that an object exists beyond particulate matter 102 (from the perspective/position of the vehicle 130) and/or an indication of whether a split return is associated with particulate matter, with translucent matter, or with another surface (e.g., pedestrian, vehicle, roadway, essentially anything else).

The planning component 138 may determine instructions for controlling operations of the vehicle 130 based at least in part on perception data that may be based on lidar data received from the lidar device. In particular, the planning component 138 may rely on one or more lidar device(s) of the sensor(s) 132 to determine the existence and/or position(s) of object(s) in order to safely and efficiently control operation of the vehicle 130. False positive detections of the existence of a surface by a lidar device may degrade operation of a machine that relies on lidar data, like vehicle 130. Moreover, wrongly attributing split returns as being particulate or translucent matter merely by virtue of being split returns may be very dangerous since solid opaque objects can cause split returns at times.

In some examples, a lidar detection may comprise an indication of a distance to a detected surface calculated based at least in part on a time of delay of arrival of a reflection of light emitted by an emitted of the lidar device, as discussed above. In some examples, a processor of the lidar device and/or the perception component 136 may determine a position of the surface relative to an axis of the lidar device and/or the vehicle 130 based at least in part on a known position and/or orientation of the lidar device and/or the channel (e.g., altitude and/or azimuth.).

The planning component may determine, based at least in part on perception data, including any indications that a split return is or is not associated with particulate matter and/or a likelihood or probability map of an object's existence beyond particulate matter 102 from the lidar sensor, a plurality of candidate trajectories for controlling motion of the vehicle 130 in accordance with a receding horizon technique (e.g., 1 micro-second, half a second, 2 seconds, 5 seconds, 10 seconds, or any other near-term time period) to control the vehicle to traverse the route (e.g., in order to avoid any of the detected objects); and determine one of the candidate trajectories as a trajectory 146 that may be used to generate a drive control signal that may be transmitted to the controller(s) 142 for actuating drive components of the vehicle 130. In order to generate such a trajectory 146, the perception component may determine controls sufficient to arrive at the position and/or orientation identified by the trajectory 146. FIG. 1 depicts an example of a trajectory 146 that may ultimately be selected from among candidate trajectories according to the techniques discussed herein, represented as an arrow indicating a target steering angle, target steering rate, target velocity, and/or target acceleration for the controller(s) 142 to track, although the trajectory itself may comprise instructions for controller(s), which may, in turn, actuate a drive system of the vehicle 130. The depicted trajectory 146 may be based at least in part on an indication that split returns associated with particulate matter 102 include split returns associated with an object behind the particulate matter 102. Additionally or alternatively the depicted trajectory 146 may be determined based at least in part on a likelihood or a probability map indicating that an object exists or likely exists (e.g., the likelihood meets or exceeds a threshold) beyond the particulate matter 102. Note that, as discussed herein, the planning component 138 may additionally or alternatively control other components of the vehicle 130, such as doors, windows, emitters (e.g., sound, light, etc. emitter(s)), interior speakers and/or displays, etc.

Example Split Returns

Figure 2B:
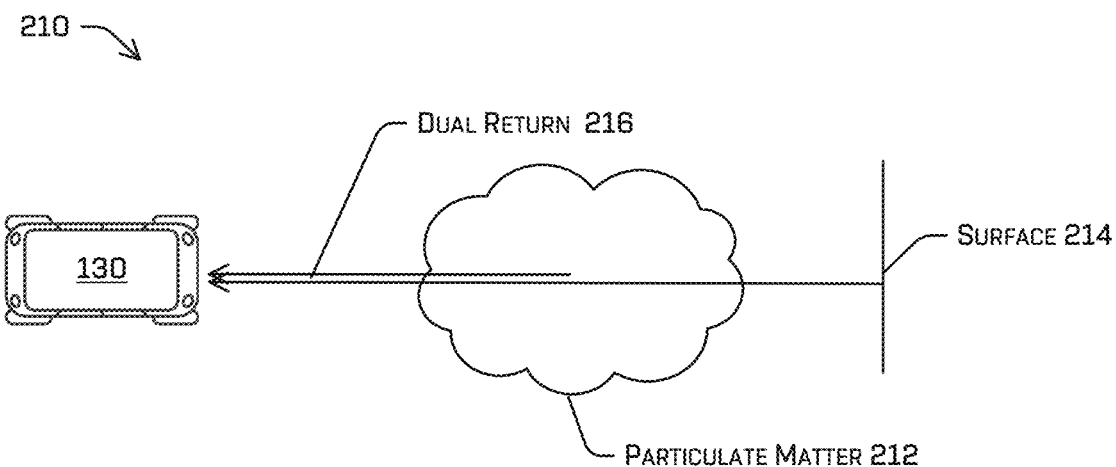

FIGS. 2A and 2B illustrate two different instances where a transmitted beam may be split, resulting in a split return or dual return. FIG. 2A depicts an example scenario 200 in which a pedestrian 202 is crossing a roadway in front of a vehicle 130. A first transmitted pulse from a lidar device of the vehicle 130 fully reflects off the pedestrian 202, resulting in a single return 204 at least a portion of the transmitted pulse of light that is reflected off the pedestrian 202 back towards the lidar device. A second transmitted pulse from the lidar device only partially reflects off an edge of the pedestrian 202 back towards the lidar device and another part of the transmitted pulse continues on until it reflects off a surface 206 beyond the pedestrian, resulting in a split return 208 that is associated with a partial reflection off of both the pedestrian 202 and the surface 206.

FIG. 2B depicts an example scenario 210 in which particulate matter 212 obscures or exists in a roadway in front of a vehicle 130. A transmitted pulse from a lidar device of the vehicle 130 partially reflects off some of the particulate matter (e.g., a droplet, dust) and continues on to reflect off of a surface 214, resulting in a dual return 216 that is associated with a partial reflection off of both the particulate matter 212 and the surface 214. In some examples, if the particulate matter 212 is particularly dense, the second (or further additional) return may not reach a surface at all and may be another reflection from within the particulate matter 212. In other words, the transmitted light may be fully reflected by the particulate matter 212 and may show up as a dual return, which may be substantially indistinguishable from split returns.

Example Output Signals Techniques for Screening False Returns

Figure 3:
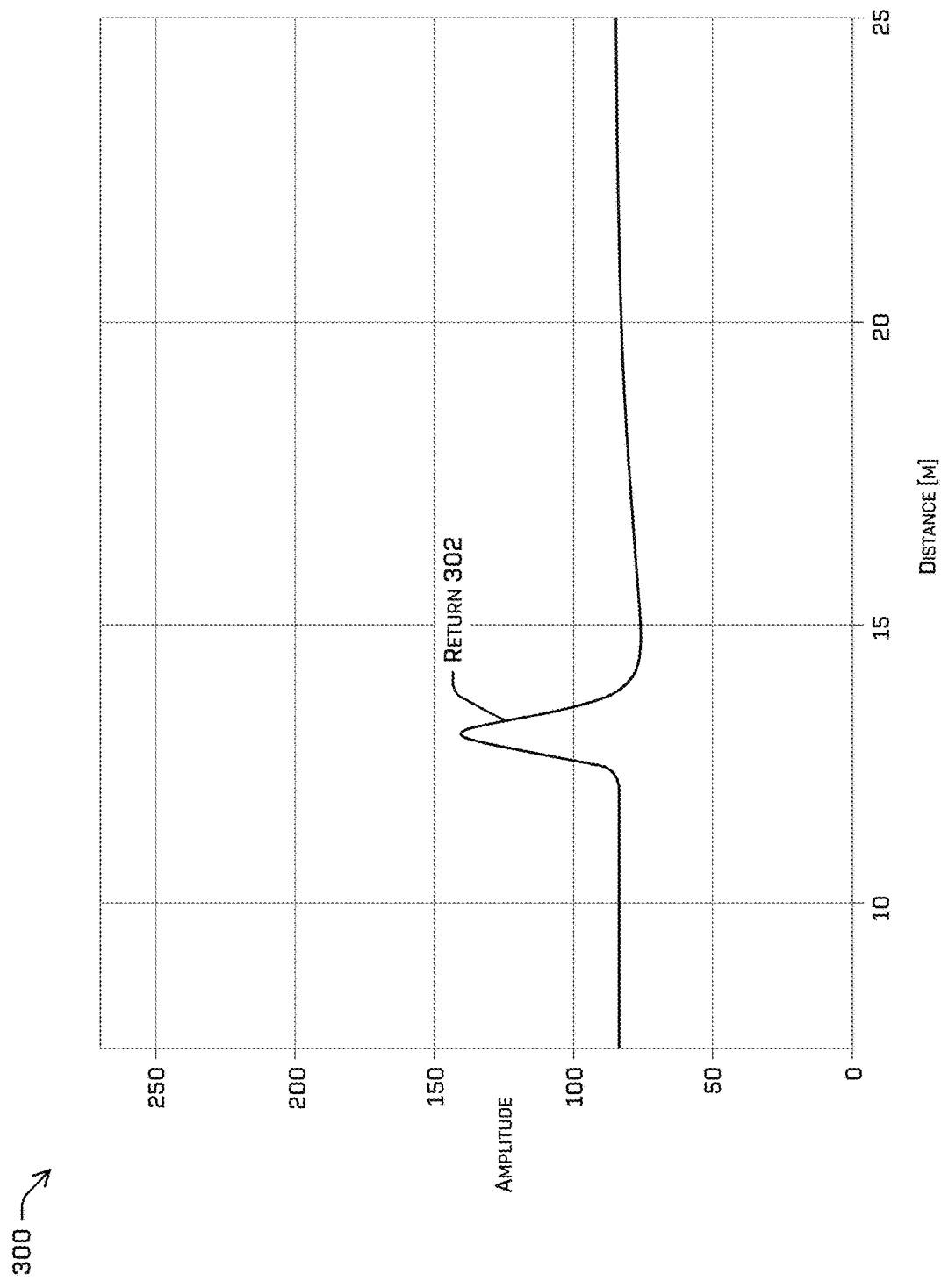
FIG. 3 illustrates a signal diagram of a single return.
Figure 4:
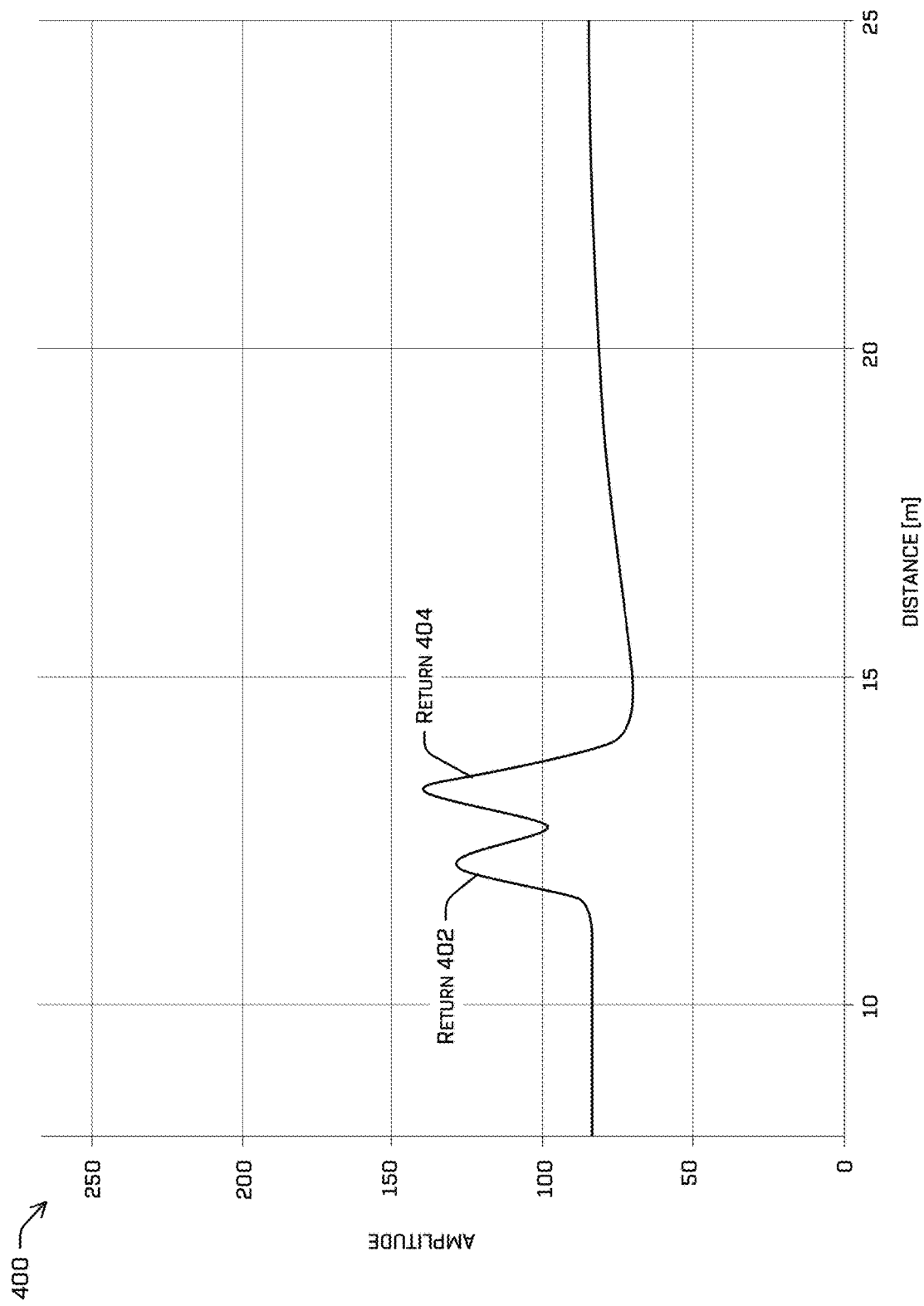
FIG. 4 illustrates a signal diagram of a split return.

FIGS. 3 and 4 illustrate example signal diagrams of output signals received from a sensor of a channel responsive to various reflections. The example signal diagrams depict an amplitude of each output signal (y-axis) over time (x-axis). Although the signal diagrams depict a magnitude of the output signals as an amplitude, it is contemplated that the output of a sensor of a channel may depend on the type of sensor used. For example, if the lidar system utilizes a sensor that comprises a SPAD, the output of the SPAD (and/or its associated circuitry) may actually be a pulse output and/or count (since the SPAD operates in Geiger mode), whereas other APDs may output a voltage that reflects the intensity of light incident on the sensor (as in the case of SiPMs and/or more traditional APDs). Regardless of the particular type(s) of sensors used, for the sake of simplicity FIGS. 3 and 4 and the corresponding description discuss the intensity of a signal as an amplitude, although it is understood that intensity may be measured in a variety of ways, depending on the sensor type and/or use (e.g., counts per nanosecond, voltage, current, power). Similarly, since the output signal may vary depending on the type of sensor used, the detection threshold discussed herein may have units that correspond with the sensor type used. For example, the detection threshold may be an indication of voltage, current, power, count rate, any combination thereof, etc.

Moreover, in some examples, although the depicted output signals have an appearance that looks like an analog signal, it is understood that intermediate electronics between the sensor and the detector may (or may not) comprise a DAC. In other words, the output signal may be sampled, amplified, and/or discretized in a manner that is not reflected in the figures and is not of consequence for this discussion, other than to note that the output signals may be digital signals and the detector may comprise a processor of some kind and/or, inversely, that the output signals may be analog signals and the detector may comprise an analog circuit.

The example signal diagrams illustrated in FIGS. 3 and 4 may represent the output signal generated by a sensor of a channel for the duration of time for which that sensor was active/being read by a detector. In some examples, this duration of time may be 1 microsecond, although it is understood that the duration may depend on the effective range of the lidar and/or the desired range of measurement. The depicted output signals are examples of signals that were generated contemporaneously.

FIG. 3 illustrates a signal diagram of an output signal 300 that includes a single return 302. Detecting the existence of return 302 may include determining that a maximum exists in the signal. FIG. 3 illustrates an example of an output signal 300 generated by sensor 106 based at least in part on light reflected to the sensor 106 by a surface, such as surface 118, and therefore includes a (true positive) return 302.

In some examples, detector 114 may identify a portion of an output signal that meets or exceeds a detection threshold as a return. In some examples, the detection threshold may be a variable stored and/or controlled by detector 114 and/or a downstream device such as, for example, a perception component. The detection threshold may preliminarily be set to avoid identifying noise as a detection. U.S. application Ser. No. 16/851,033 filed Apr. 16, 2020, 2019, the entirety of which is incorporated by reference, discusses the detection threshold and/or other elements in additional detail. The detection threshold may correspond to an amplitude value. For example, in the depicted example, an amplitude of 100 may be the detection threshold.

The detector 114 may indicate that a depth measurement associated with a return is a true positive by outputting a detection and/or by outputting a detection that indicates that the depth measurement is a true positive. The detector 114 may indicate that a depth measurement associated with a return is a false positive by suppressing output of a detection and/or by outputting a detection that indicates that the depth measurement is a false positive. Including an indication that a detection is a false detection or a true detection, according to the detector 114, may provide extra information to a downstream component to may conduct further false positive screening. In some examples, although detector 114 may output an indication of a true detection a downstream component, such as a perception component, may determine that the detection is a false detection, according to techniques discussed below.

FIG. 4 illustrates a signal diagram of an output signal 400 that includes a split return, including return 402 and return 404. For the sake of simplicity, only split returns are discussed herein, although it is understood that an output signal having additional numbers of maxima may be encountered. The techniques discussed herein may be extended to such instances. For example, an output signal may indicate three returns associated with three reflections, four returns associated with four reflections, or more. In some examples, upon determining that the output signal 400 includes multiple returns, the detector 114 may output the returns themselves, depth measurements associated with the respective returns, and/or attendant data, such as the transmit power of the transmitted light that resulted in the output signal 400, an azimuth or other angle associated with the output signal 400, and/or the like.

Example Split Return Depictions

FIG. 5 illustrates lidar data 500 associated with various objects, including single returns illustrated in light gray and split returns illustrated in dark gray. Notably, FIG. 5 includes lidar associated with a vehicle 502 and three pedestrians 504, 506, and 508. Note that the vehicle and pedestrians all cause split returns at each respective object's edges.

Figure 6:
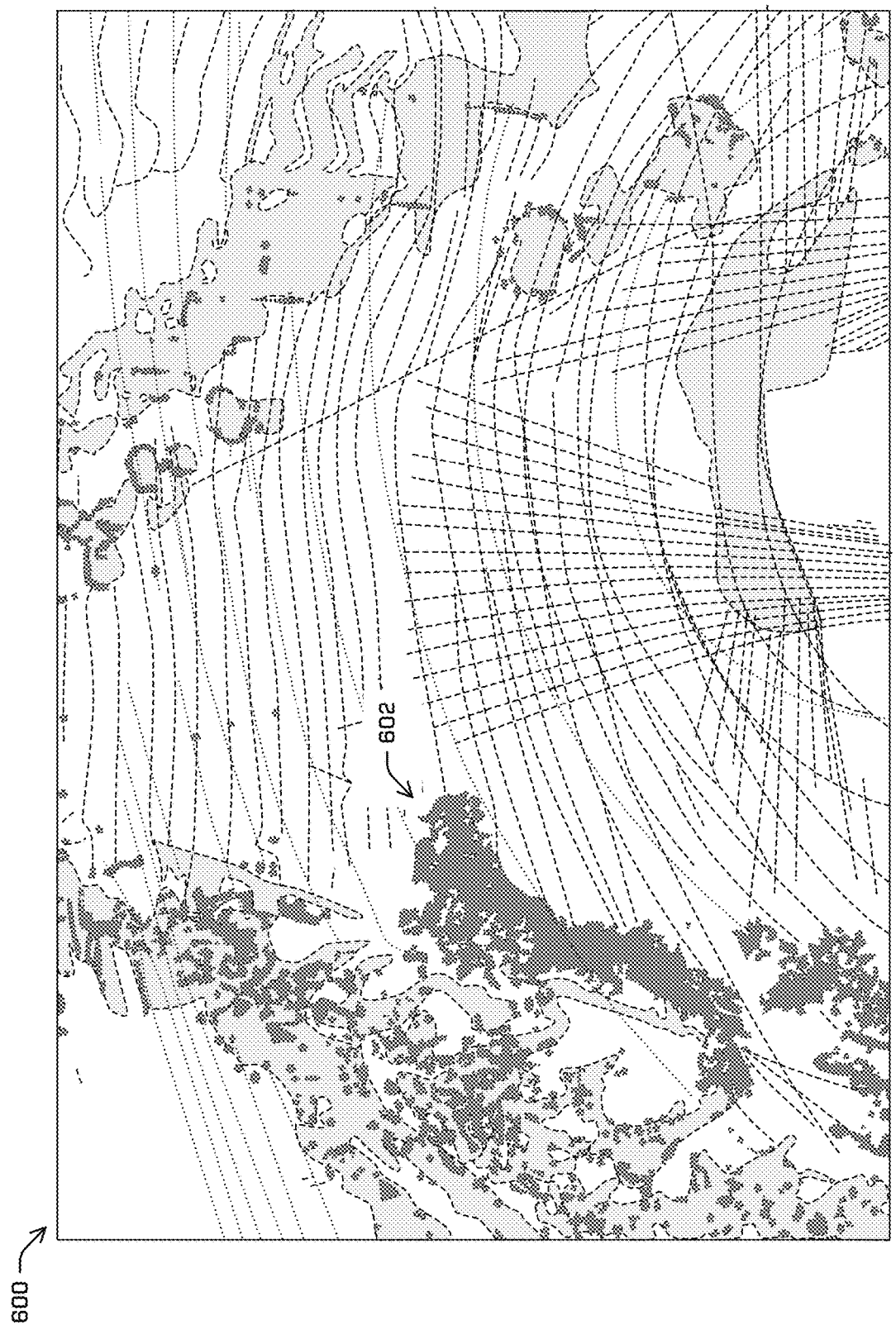
FIG. 6 illustrates returns associated with various objects, including split returns (illustrated in dark gray) associated with particulate matter.

FIG. 6 illustrates returns associated with lidar data 600 associated with a roadway, sidewalk, and particulate matter 602, including single returns illustrated in light gray and split returns illustrated in dark gray. Note that the particulate matter 602 is almost entirely a solid mass of split returns.

Techniques for Classifying Split Returns

Figure 7:
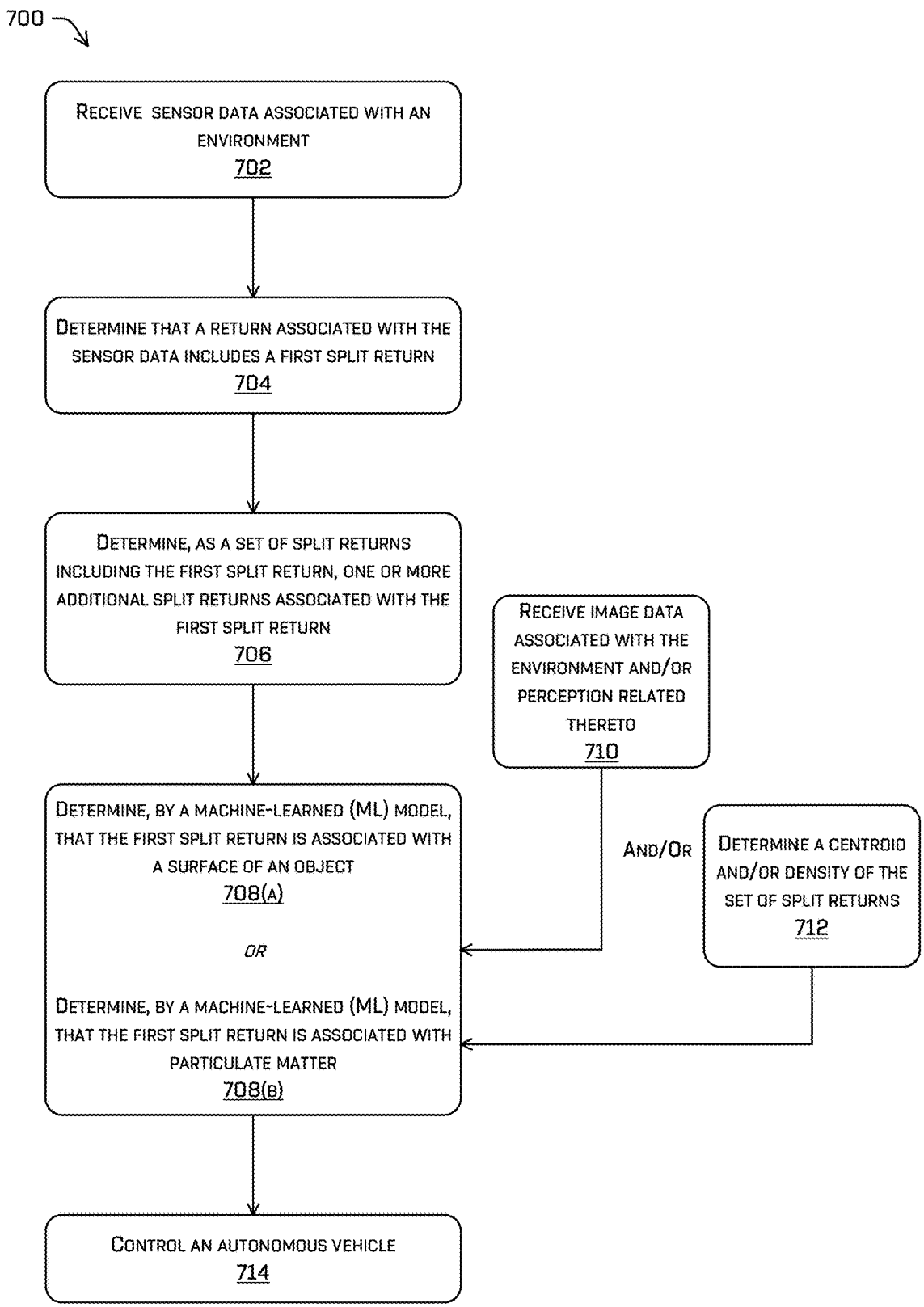
FIG. 7 illustrates a flow diagram of an example process for disambiguating whether a split return is associated with a surface or with particulate matter.

FIG. 7 illustrates a flow diagram of an example process 700 for disambiguating whether a split return is associated with a surface or with particulate matter. In some examples, example process 700 may be executed by detector 114 of a lidar device or, in additional or alternate examples, may occur further downstream in a pipeline of a perception component of a vehicle.

At operation 702, example process 700 may comprise receiving sensor data associated with an environment. For example, the sensor data may comprise a form of sensor data capable of including split returns, such as lidar data.

At operation 704, example process 700 may comprise determining that a return associated with the sensor data includes a first split return. Operation 702 may include determining that an output signal generated by a sensor includes two or more maxima. This may include determining that multiple portions of the output signal meet or exceed a detection threshold.

At operation 706, example process 700 may comprise determining, as a set of split returns including the first split return one or more additional split returns associated with the first split return. As a non-limiting example, the set of split returns may comprise all returns received over a period of time and/or associated with a portion (including all) of the environment. Operation 706 may include determining the set of split returns by determining split return(s) that are within a specified distance of the first split return. In some examples, operation 706 may include searching for split returns that are within the specified distance of another split return and grouping such split returns into sets. In other words, the set of split returns may be composed of split returns that have at least n split returns within the specified distance and where at least one of those n split returns is also a neighbor (e.g., split return within threshold distance) of another split return of the set, where n is a positive integer. In one example, n may be 1, meaning that, to be included a split return is within a threshold distance of another split return. In another example, n may be greater than 1, meaning that, to be included in the set, a split return must be within a threshold distance of n other split returns. In an additional or alternate example, determining the set of split returns may be based at least in part on k-means clustering, k-medoids clustering, expectation maximization (EM) clustering, EM using Gaussian mixture models (EM-GMM), density-based spatial clustering of applications with noise (DBSCAN), and/or the like, where the set of split returns is a cluster determined according to a clustering algorithm. Regardless, if a split return is detected, the vehicle may determine whether additional split returns have been detected and, if so, whether those split returns are within a specified. In some examples, detecting a split return and/or determining that multiple split returns exist within a threshold distance and/or a density of split returns within a region may trigger execution of the clustering algorithm.

At operation 708(a), example process 700 may comprise determining, by an ML model, that the first split return is associated with a surface of an object. Alternately, at operation 708(b), example process 700 may comprise determining, by the ML model, that the first split return is associated with particulate matter.

In some examples, the ML model may be trained to differentiate between particulate matter and solid surfaces. In another example, the ML model may be trained to differentiate between particulate matter; a transparent or semi-opaque (but solid) surface, such as glass or ice; and a solid opaque surface. Regardless, the ML model may receive the set of split returns and may be configured to determine whether the set of split returns forms a hollow shape or edge versus a solid shape. In some examples, the ML model may determine whether the set forms a hollow or solid shape based at least in part on determining a centroid or medoid of the set and determining how many split returns surround the centroid or how densely the centroid is surrounded. Supervised training may be used to help distinguish and delineate the density and/or number thresholds to disambiguate between a hollow or solid shape.

If the ML model classifies the set of split returns as forming a hollow shape or edge, the ML model may output an indication that the split returns (or at least the first split return is) are associated with a solid surface. This may be an indication that the split returns are associated with split beams from object edges, as opposed to partial reflections caused by particulate matter. If the ML model classifies the set of split returns as forming a solid shape, the ML model may output an indication that the split returns (or at least the first split return is) associated with particulate matter. In some examples, if the ML model determines that the first split return is associated with particulate matter (or if particulate matter is otherwise detected), example process 800 may be triggered.

Additionally or alternatively, the ML model may include an edge detection model that determines an edge of the set of split returns. In such an instance, an ML pipeline may determine a percentage of the split returns that are within a threshold distance of the edge. If the percentage meets or exceeds a threshold percentage, the ML pipeline model may indicate that the set of split returns (or the first split return) is associated with a solid surface. Additionally or alternatively, such an edge may be used as input data to an ML model that classifies a split return or a set of split returns as forming a solid shape and therefore associated with particulate matter or as forming a hollow shape and therefore being associated with a solid surface.

In some examples, operation 708 may be executed by an ML model with two output heads—one output head that outputs a confidence interval or confidence score (e.g., indicated as a logit) indicating a likelihood that a split return and/or set of split returns is associated with a solid surface and a second output head that outputs a confidence interval or confidence score indicating a likelihood that a split return and/or set of split returns is associated with a solid surface. Training this ML model may include storing sensor data in a memory of the vehicle, e.g., as part of a log, and post-processing the sensor data to label split returns as being returns caused by particulate matter, translucent or semi-opaque matter, or an opaque surface; or particulate matter or a solid surface, depending on whether the ML model is being trained to have three output heads and additionally differentiate between translucent and/or semi-opaque material. This sensor data may be provided as input to the ML model during training and the labels may be used to determine a loss (e.g., error) that is backpropagated through the ML model, altering the ML model to reduce the loss. In some examples, operation 708 may include determining a relative power of returns indicated in an output signal. For example, a single return may be associated with a greater amplitude or power compared to other returns in the same signal. In such an instance, the other returns may be indicated as being false positives.

In some examples, example process 700 may additionally or alternatively include operation(s) 710 and/or 712. In some examples, operation(s) 710 and/or 712 may be combined with operation 708(*a*) or 708(*b*) as part of an ML pipeline, although it is understood that operation 710 and/or 712 may replace operation 708(*a*) or 708(*b*) in some examples.

At operation 710, example process 700 may comprise receiving image data that may comprise visual and/or thermal data (e.g., long wavelength, infrared, etc.) associated with the environment and/or perception data determined based at least in part on the image and/or thermal data. For example, operation 710 may include executing object detection using a computer vision ML model (e.g., U-Net, ParseNet, SegNet, or the like for segmentation and/or YOLO, fast R-CNN, HyperNet, or the like), using the image and/or thermal data as input to see if the ML model detects particulate matter. Detecting particulate matter using thermal data may comprise search and/or clustering algorithms for identifying a portion of a thermal image that is an outlier. For example, determining the ROI may comprise determining a region of the thermal image associated with temperatures that are a standard deviation or more from a mean temperature of the image and/or a mean ambient temperature measured by a thermometer. In some examples, another ML model trained to identify such regions may receive the thermal image as input and output the ROI.

If the computer vision ML model detects particulate matter, the computer vision ML model may output an instance or semantic segmentation (e.g., a pixel mask) and/or region of interest identifying a portion of the image data associated with the particulate matter. The computer vision ML model may additionally or alternatively output a confidence score with the detection. If the computer vision ML model detects particulate matter in a portion of the image data, the ML pipeline may project lidar data into an image space and image sensor coordinate frame to determine whether any of the projected lidar data lies within the detection. This may be used to corroborate an output of the first ML model at operation 708.

For example, the output of the computer vision ML model itself, a percentage or number of the projected lidar points that lie within a detection, and/or the confidence score determined by the computer vision ML model may be used to weight outputs of the first ML model. For example, an indication that particulate matter exists or that a split return point was projected into a portion of the image identified by an instance or semantic segmentation or ROI as being associated with particulate matter may be used to up-weight the confidence score output at operation 708(*a*). In some examples, where the first ML model includes dual heads that output confidence scores associated with the different classifications, the particulate matter classification confidence score could also be down-weighted. Conversely, if neither was true (no particulate matter detected or split return projected outside the portion of the image identified as being associated with particulate matter), the confidence score output by the ML model output head associated with solid surfaces may be down-weighted and the confidence score output by the particulate matter output head may be up-weighted.

Operation 710 may similarly additionally or alternatively comprise determining whether a split return or a number of split returns is associated with thermal data identified as being associated with particulate matter by the computer vision model (or a modified computer vision model trained on thermal image data). Operation 710 may additionally or alternatively comprise determining a distance of the projected split return from the portion of the thermal image (and/or from a nearest portion of perception data) and identifying the projected split return as being associated with the particulate matter if the distance is less than a threshold distance. Note that in the latter example, a weight attributable to a projected split return that was outside the portion of the thermal data detected as being associated with particulate matter but being within the threshold distance of it may be lower than a weight associated with a projected split return that is inside the portion of the thermal data detected as being associated with particulate matter.

In an additional or alternate example, the data discussed at operation 710 may be used as input to the ML model of operation 708. For example, the ML model may receive, as input, an image patch or other portion of an image identified as being associated with particulate matter, identification of split returns that are within a particulate matter detection, etc. in addition to the set of split returns that may themselves be provided as input to the ML model.

At operation 712, example process 700 may comprise determining a centroid, medoid, mean location, or the like of the set of split returns. For example, determining this centroid may be part of a clustering process that occurs at operation 706, if a clustering algorithm is used. Regardless, the centroid, medoid, or the like of the set of split returns may be determined and a variance or average distance of the other split returns to that centroid, or the like may be determined. The higher the variance or average distance, the more the solid surface output head confidence score may be up-weighted, whereas, as the variance/average distance decreases, the particulate matter confidence score may be up-weighted.

Additionally or alternately, a region may be sampled based at least in part on the centroid or the like and a density of split returns or ratio of split returns to single returns within that region may be determined. The sampled region may be scaled based at least in part on a number and/or size of a cluster of the set of split returns and/or multiple regions may be sampled, in some examples, and the results averaged or soft-maxed. If the density and/or ratio meets or exceeds a density threshold or ratio threshold, respectively, the vehicle may indicate that the first split return and/or the set of split returns is associated with particulate matter and/or may up-weight the solid surface confidence score. Conversely, ff the density and/or ratio do not meet or exceed a density threshold or ratio threshold, respectively, the vehicle may indicate that the first split return and/or the set of split returns is associated with a solid surface and/or may up-weight the particulate matter confidence score.

In examples, where various weights are applied to confidence scores determined by the first ML model, after the weights are applied, a softmax layer (or similar layer) may determine the greatest output between the confidence scores output by the first ML model. In some examples, the centroid/medoid, coverage of the centroid/medoid/core point (e.g., a percentage of a surface of a sphere or other shape around the centroid/medoid that would have a dual return associated with its surface if the dual return were projected onto the surface towards the centroid/medoid in other words, the coverage indicates how surrounded the centroid is by dual returns that are within a threshold distance defined by the clustering algorithm, such as a threshold distance defined by k-means, or that meet a threshold density defined by DBSCAN), cluster, density, and/or the like may be additionally or alternatively provided to the ML model of operation 708 as input in addition to the set of split returns. In some examples, the input data may include image-related data, as discussed above at operation 708, density and/or centroid related data as discussed regarding operation 710, and/or the split return or set of split returns themselves.

At operation 714, example process 700 may comprise controlling an autonomous vehicle based at least in part on the indication determined at operation 708(a) or 708(b).

Techniques for Determining a Particulate Matter-Occluded Object Probability

Figure 8:
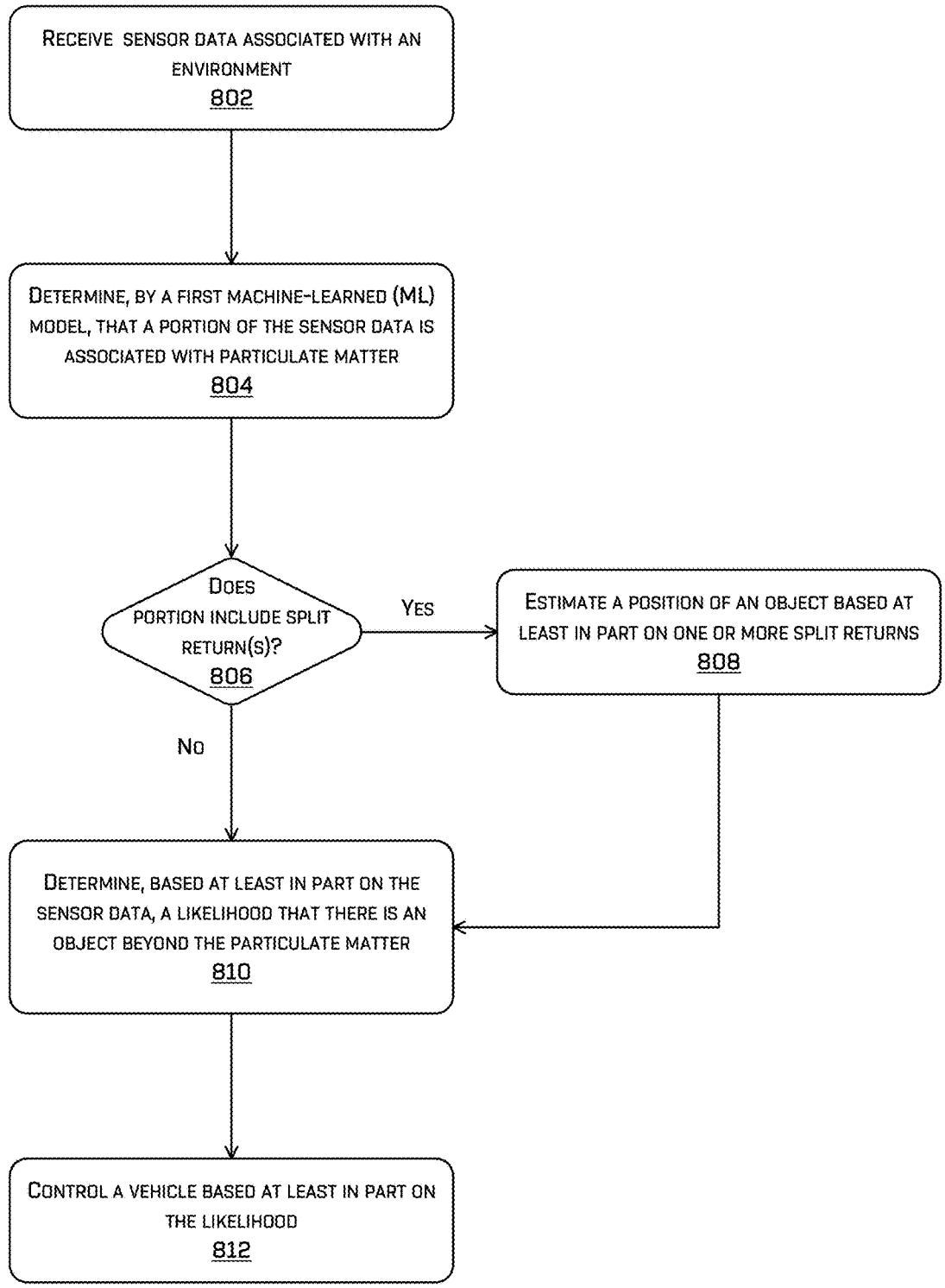
FIG. 8 illustrates a flow diagram of an example process for determining a likelihood that an object exists beyond particulate matter.

FIG. 8 illustrates a flow diagram of an example process 800 for determining a likelihood that an object exists beyond particulate or translucent matter. In some examples, a perception component of a vehicle may execute example process 800 based at least in part on detecting particulate matter according to any of the techniques discussed herein.

At operation 802, example process 800 may comprise receiving sensor data associated with an environment. The sensor data may include lidar data in one example. In some examples, the sensor data may include lidar data, radar data, image data (e.g., thermal, visual), sonar, and/or the like.

At operation 804, example process 800 may comprise determining, by a first ML model, that a portion of the sensor data is associated with particulate matter. Operation 804 may include receiving an object detection associated with particulate matter from one or more components of a perception component. For example, a lidar pipeline of the perception component may detect the particulate matter and may identify lidar points associated therewith, according to the techniques discussed herein and/or according to U.S. patent application Ser. No. 16/851,033 filed Apr. 16, 2020. Additionally or alternatively visual, thermal, and/or radar pipeline(s) may output respective identifications of the existence of the particulate matter. In some examples, operation 804 may include operation 708, 710, and/or 712. The pipelines discussed herein may indicate either discrete sensor data that is associated with the particulate matter (e.g., instance/semantic segmentation) and/or a respective pipeline may identify a region of interest (ROI) associated with the particulate matter, which may be a more general indication of where the particulate matter is in the environment.

At operation 806, example process 800 may comprise determining whether the portion of sensor data includes or is associated with any split return(s). For example, operation 806 may include projecting a lidar split return into another sensor's coordinate frame/space and determining whether the lidar split return is within a portion of the sensor data indicated as being associated with the particulate matter. Additionally or alternatively, the lidar pipeline may determine whether a specific split return or set of split returns is associated with particulate matter, such as according to at least portions of example process 700. If the portion of sensor data includes split return(s), example process 800 may continue to operation 808. Otherwise, example process 800 may continue to operation 810.

At operation 808, example process 800 may comprise estimating a position of an object beyond the particulate matter (from the perspective of a position of the sensor(s) of the vehicle) based at least in part on the one or more split returns. In some examples, operation 808 may include using the last return in time of an output signal, which corresponds to the further distance measurement, to estimate the position of the object.

At operation 810, example process 800 may comprise determining, based at least in part on the sensor data, a likelihood (i.e., posterior probability indicated by a logit, confidence interval, or the like) that there is an object beyond the particulate matter. In some examples, the likelihood may be determined by an ML, model based at least in part on input data that includes:

object detection(s) associated with the particulate matter (e.g., the portion of respective sensor data as being identified as being associated with particulate matter, mask shapes, ROI shapes, from) from any of the pipelines discussed herein (e.g., lidar alone; lidar and visual; lidar and radar; lidar, visual, and radar; lidar, visual, radar, and thermal; etc.);

split return(s) associated with the particulate matter; and/or a transmit power associated with the emitted beam(s) of light that resulted in the returns associated with the particulate matter In some examples, a distance and/or reflectivity may be held constant or multiple likelihoods may be determined in associated with different distances and/or reflectivities. Operation 810 may include determining a probability map, which may identify the likelihood at different distances beyond the particulate matter. The probability map may be a multi-dimensional data structure or probability distribution that identifies the likelihoods at different distances and at different reflectivities within a range of reflectivities. In some examples, the range of reflectivities may be associated with a common range of different colored clothing, skin, fur, plastic, and the like. In some examples, no split return(s) may exist in association with the particulate matter and operation 810 may be recast to determine a likelihood that a split return will be generated if the transmit power is increased.

In some examples, the ML model may be trained based at least in part on training data generated by storing sensor data and/or perception data associated with particulate matter detections and. The ML model may be provided any of the data discussed above and may predict a binary indication or continuous confidence score associated with different distances beyond the particulate matter and different reflectivities. Hidden layers of the ML model may be altered based at least in part on reducing a difference between an actual object reflectivity and location behind the particulate matter. Additionally or alternatively, the logged data may be to a probability distribution, such as a bimodal distribution (e.g., in an example where the ML model(s) output a bimodal confidence score), a Poisson distribution, a Gaussian distribution, and/or the like.

At operation 812, example process 800 may comprise controlling a vehicle based at least in part on the likelihood, whether the likelihood is a posterior probability determined by an ML model or a probability map. For example, the planning component may determine a trajectory for controlling the vehicle based at least in part on the likelihood or probability map. For example, controlling the vehicle, based at least in part on the likelihood, may include determining a minimum tolerable likelihood, a transmit power that was/is being used by the vehicle, and/or a minimum and/or maximum reflectivity to determine a bounded region of the probability map. The bounded region of the probability map may indicate a range of distances at which an object may exist beyond the particulate matter, which the planning component may use to determine a trajectory for controlling the autonomous vehicle, such as avoiding the particulate matter entirely or controlling a speed of the autonomous vehicle such that the braking power of the autonomous vehicle may stop before a nearest point that an object is likely to exist (i.e., a nearest distance identified in the probability map associated with a likelihood that meets or exceeds the minimum likelihood tolerated/set by the vehicle). Such a determination may skew towards solving for a worst case scenario of a darkly colored and/or diffusive material, such as dark fur or clothing.

Example Probability Map

Figures 9A, 9B:
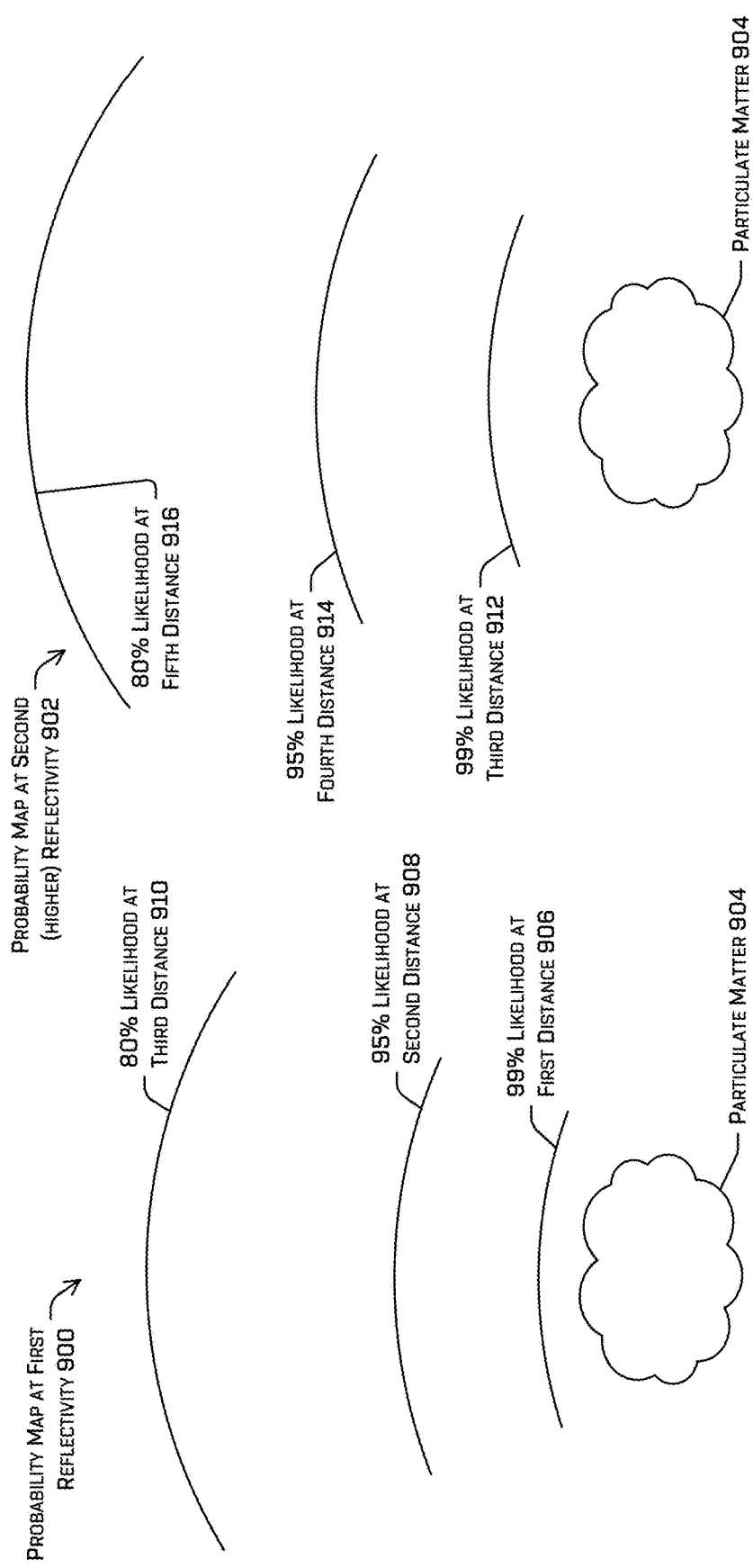
FIGS. 9A and 9B illustrate top-down views of two different probability maps of whether an object exists beyond particulate for two different reflectivities.

FIGS. 9A and 9B illustrate top-down views of two different probability maps (900 and 902) or two different portions of a multi-dimensional probability map of likelihoods that an object exists beyond particulate matter for two different reflectivities. The scenario is identical. The vehicle 130 and the particulate matter 904 is the same and at the same distance. It is assumed that the transmission power of the emitted light beam was held constant, within technical tolerances. FIGS. 9A and 9B illustrate two of two or more probability maps that the particulate matter component may output, although it is understood that the vehicle may search for an object of a specific reflectivity, in which case a single probability map may be output. It is also understood that FIGS. 9A and 9B may be just two portions of continuously defined space identifying a continuous range of reflectivities, distances, and/or transmit power. Additionally or alternatively, the reflectivities, distances, and/or transmit power may be sampled at regular intervals.

The probability maps 900 and 902 depict the distances at which the likelihood of an object existing/reflecting light back/causing a dual reflection is 99%, 95%, and 80% at a specific reflectivity. For example, probability map 900 is associated with a reflectivity that is lower than the reflectivity of probability map 902. Therefore, the distance at which there is a 99% likelihood that an object exists that could cause a dual reflection is at 906, a 95% likelihood is at 908, and an 80% likelihood is at 910; whereas, for probability map 902 these same likelihoods are associated with distances that are further from the vehicle 130 (see distance 912, 914, and 916, respectively). In some examples, an object reflectance may be known if an object was previously detected and tracked by the perception component. This data may not be available, though, and object(s) may exist beyond the particulate matter, of which the perception component is unaware.

Note that, although the likelihoods in FIGS. 9A and 9B decrease with distance, it is understood that the reverse may be true. For example, the ML model may be trained to indicate a likelihood of an object existing at any point up until that distance. In other words, the likelihood may indicate a likelihood that an object exists between the particulate matter and that distance beyond the particulate matter. In such an example, the likelihoods may increase with distance.

Example System

Figure 10:
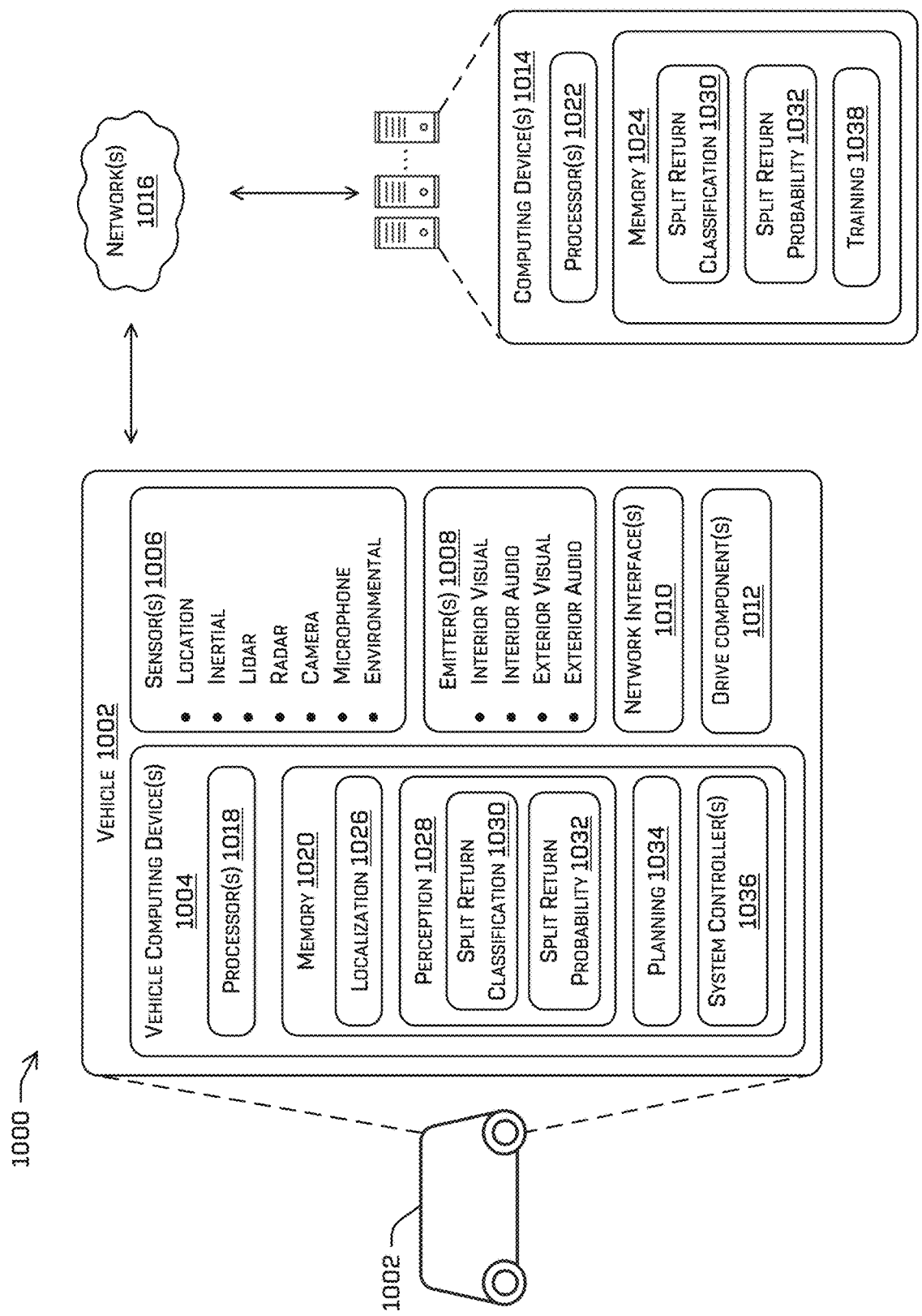
FIG. 10 illustrates an example system architecture including a vehicle and/or remote computing device(s).

FIG. 10 illustrates a block diagram of an example system 1000 that implements the techniques discussed herein. In some instances, the example system 1000 may include a vehicle 1002, which may represent the vehicle 130 in FIG. 1. In some instances, the vehicle 1002 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 1002 may be a fully or partially autonomous vehicle having any other level or classification. Moreover, in some instances, the techniques described herein may be usable by non-autonomous vehicles as well.

The vehicle 1002 may include a vehicle computing device(s) 1004, sensor(s) 1006, emitter(s) 1008, network interface(s) 1010, and/or drive component(s) 1012. Vehicle computing device(s) 1004 may represent computing device(s) 134 and sensor(s) 1006 may represent sensor(s) 132. The system 1000 may additionally or alternatively comprise computing device(s) 1014.

In some instances, the sensor(s) 1006 may represent sensor(s) 132 and may include lidar sensors, radar sensors, ultrasonic transducers, sonar sensors, location sensors (e.g., global positioning system (GPS), compass, etc.), inertial sensors (e.g., inertial measurement units (ImUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 1006 may include multiple instances of each of these or other types of sensors. For instance, the radar sensors may include individual radar sensors located at the corners, front, back, sides, and/or top of the vehicle 1002. As another example, the cameras may include multiple cameras disposed at various locations about the exterior and/or interior of the vehicle 1002. The sensor(s) 1006 may provide input to the vehicle computing device(s) 1004 and/or to computing device(s) 1014.

The vehicle 1002 may also include emitter(s) 1008 for emitting light and/or sound, as described above. The emitter(s) 1008 in this example may include interior audio and visual emitter(s) to communicate with passengers of the vehicle 1002. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, door actuators, etc.), and the like. The emitter(s) 1008 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 1002 may also include network interface(s) 1010 that enable communication between the vehicle 1002 and one or more other local or remote computing device(s). For instance, the network interface(s) 1010 may facilitate communication with other local computing device(s) on the vehicle 1002 and/or the drive component(s) 1012. Also, the network interface(s) 1010 may additionally or alternatively allow the vehicle to communicate with other nearby computing device(s) (e.g., other nearby vehicles, traffic signals, etc.). The network interface(s) 1010 may additionally or alternatively enable the vehicle 1002 to communicate with computing device(s) 1014. In some examples, computing device(s) 1014 may comprise one or more nodes of a distributed computing system (e.g., a cloud computing architecture).

The network interface(s) 1010 may include physical and/or logical interfaces for connecting the vehicle computing device(s) 1004 to another computing device or a network, such as network(s) 1016. For example, the network interface(s) 1010 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 1004 and/or the sensor(s) 1006 may send sensor data, via the network(s) 1016, to the computing device(s) 1014 at a particular frequency, after a lapse of a predetermined period of time, in near real-time, etc.

In some instances, the vehicle 1002 may include one or more drive components 1012. In some instances, the vehicle 1002 may have a single drive component 1012. In some instances, the drive component(s) 1012 may include one or more sensors to detect conditions of the drive component(s) 1012 and/or the surroundings of the vehicle 1002. By way of example and not limitation, the sensor(s) of the drive component(s) 1012 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 1012. In some cases, the sensor(s) on the drive component(s) 1012 may overlap or supplement corresponding systems of the vehicle 1002 (e.g., sensor(s) 1006).

The drive component(s) 1012 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 1012 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 1012. Furthermore, the drive component(s) 1012 may also include one or more communication connection(s) that enable communication by the respective drive component with one or more other local or remote computing device(s).

The vehicle computing device(s) 1004 may include processor(s) 1018 and memory 1020 communicatively coupled with the one or more processors 1018. Memory 1020 may represent memory 142. Computing device(s) 1014 may also include processor(s) 1022, and/or memory 1024. The processor(s) 1018 and/or 1022 may be any suitable processor capable of executing instructions to process data and perform operations as described herein. By way of example and not limitation, the processor(s) 1018 and/or 1022 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 1020 and/or 1024 may be examples of non-transitory computer-readable media. The memory 1020 and/or 1024 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 1020 and/or memory 1024 may store a localization component 1026; perception component 1028, which may include split return classification component 1030 and/or split return probability component 1032; planning component 1034; and/or system controller(s) 1036—zero or more portions of any of which may be hardware, such as GPU(s), CPU(s), and/or other processing units. Memory 1024 may additionally or alternatively store a training component 1038. Perception component 1028 may represent perception component 136, planning component 1034 may represent planning component 138, and split return classification component 1030 and/or split return probability component 1032 may represent/compose the particulate matter component 140.

In at least one example, the localization component 1026 may include hardware and/or software to receive data from the sensor(s) 1006 to determine a position, velocity, and/or orientation of the vehicle 1002 (e.g., one or more of an x-, y-, z-position, roll, pitch, or yaw). For example, the localization component 1026 may include and/or request/receive map(s) of an environment and can continuously determine a location, velocity, and/or orientation of the autonomous vehicle within the map(s). In some instances, the localization component 1026 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 1026 may provide data to various components of the vehicle 1002 to determine an initial position of an autonomous vehicle for generating a trajectory and/or for generating map data, as discussed herein. In some examples, localization component 1026 may provide, to the perception component 1028, a location and/or orientation of the vehicle 1002 relative to the environment, detected object(s), and/or sensor data associated therewith.

In some instances, perception component 1028 may comprise a primary perception system and/or a prediction system implemented in hardware and/or software. The perception component 1028 may detect object(s) in in an environment surrounding the vehicle 1002 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 1028 may include a prediction component that predicts actions/states of dynamic components of the environment, such as moving objects. In some examples, the perception component 1028 may include a simulation component as part of the prediction portion of the perception component 1028, although the prediction portion may include a kinematics-based component and/or a Kalman filter for determining a predicted position, heading, velocity, acceleration, and/or the like associated with a dynamic object. Data determined by the perception component 1028 is referred to as perception data.

The planning component 1034 may receive a location and/or orientation of the vehicle 1002 from the localization component 1026 and/or perception data from the perception component 1028 and may determine instructions for controlling operation of the vehicle 1002 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 1012)) that the drive component(s) 1012 may parse/cause to be carried out, second instructions for the emitter(s) 1008 may be formatted according to a second format associated therewith). In some examples, where the planning component 1034 may comprise hardware/software-in-a-loop in a simulation (e.g., for testing and/or training the planning component 1034), the planning component 1034 may generate instructions which may be used to control a simulated vehicle. These instructions may additionally or alternatively be used to control motion of a real-world version of the vehicle 1002, e.g., in instances where the vehicle 1002 runs the simulation runs on vehicle during operation.

In some examples, in order to generate a path, which may comprise multiple contiguous trajectories (e.g., one trajectory begins where another one ends, including a continuous heading, velocity, acceleration, etc.), the planning component 1034 may execute a tree search and may determine action node(s) and/or prediction node(s) of the tree search by transmitting a request for the planning component to generate candidate action(s) based at least in part on an environment determined in association with a prediction node. The planning component 1034 may receive an initial state of the environment from the perception component 1028 (i.e., in association with a root node of the tree search), which the planning component 1034 may use to determine one or more candidate actions for a first time period (e.g., 0 to 1 second, 0 to 2 seconds, 0 to 0.5 seconds in the future). For example, the tree search may include executing a Monte-Carlo tree search (MCTS); partially observable Monte-Carlo planning (POMCP); Markov decision process (MDP), such as a partially observable MDP (POMDP); or the like. Additional details regarding the tree search and how to identify the trajectory and/or path to use to control the vehicle 1002 are discussed in U.S. patent application Ser. No. 17/394,334, filed Aug. 4, 2021, the entirety of which is incorporated herein by reference.

In some examples, split return classification component 1030 may execute example process 700 and may comprise a first ML model and/or first ML model pipeline that may receive input from other portions of the perception component 1028. The split return probability component 1032 may comprise a second ML model and/or second ML model pipeline that may receive input from other portions of the perception component 1028, such as other pipelines associated with different sensor modalities. Split return classification component 1030 and/or split return probability component 1032 may provide the outputs thereof as part of the perception data provided to the planning component 1034, so that the planning component 1034 may control operation of the vehicle 1002 based thereon.

The memory 1020 and/or 1024 may additionally or alternatively store a mapping system, a planning system, a ride management system, etc. Although perception component 1028, split return classification component 1030, split return probability component 1032, and/or planning component 1034, are illustrated as being stored in memory 1020 and/or 1024, perception component 1028, split return classification component 1030, split return probability component 1032, and/or planning component 1034 may include processor-executable instructions, machine-learned model(s) (e.g., a neural network), and/or hardware, such as an ASIC, FPGA, microcontroller, or the like.

As described herein, the localization component 1026, perception component 1028, split return classification component 1030, split return probability component 1032, planning component 1034, and/or other components of the system 1000 may comprise one or more ML models. For example, localization component 1026, perception component 1028, split return classification component 1030 and/or split return probability component 1032, and/or planning component 1034 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, the entirety of which is incorporated by reference herein), and/or VoxelNet. Architecture latency optimizations may include MobilenetV2, Shufflenet, Channelnet, Peleenet, and/or the like. The ML model may comprise a residual block such as Pixor, in some examples.

In some examples, the computing device(s) 1014 may train the perception component 1028, split return classification component 1030, split return probability component 1032, and/or planning component 1034, and may transmit un update or the software component itself to the vehicle 1002. In some examples, memory 1024 may store split return classification component 1030 and/or split return probability component 1032 and/or updated version(s) thereof and/or a training component 1038. Training component 1038 may control versioning of split return classification component 1030 and/or split return probability component 1032 and/or execute training data cleaning, labeling, and/or pre-processing; training; and/or testing. In some examples, the training component 1038 may collect training data from one or more autonomous vehicles according to the techniques discussed herein and/or from a simulation. The training component 1038 may comprise a simulator for simulating motion of a fluid and/or motion of a solid, which may be used to generate training data for training the ML model to differentiate between true positive split returns associated with a solid surface and split returns associated with particulate matter.

In some examples, a log in memory 1020 and/or memory 1024 may store sensor data determined by the sensor(s) 1006, perception data, planning data, safety condition(s), mitigation action(s), and/or the like. Any of this data may be used to train or refine any of the components discussed herein during ML training. In some examples, log data may be transmitted from vehicle 1002 memory 1020 to memory 1024 via network(s) 1016.

Memory 1020 may additionally or alternatively store one or more system controller(s) 1036 (which may be a portion of the drive component(s)), which may be configured to control steering, propulsion, braking, safety, emitters, communication, and other systems of the vehicle 1002. These system controller(s) 1036 may communicate with and/or control corresponding systems of the drive component(s) 1012 and/or other components of the vehicle 1002. For example, the planning component 1034 may generate instructions based at least in part on perception data generated by the perception component 1028, such as according the techniques discussed herein, and transmit the instructions to the system controller(s) 1036, which may control operation of the vehicle 1002 based at least in part on the instructions.

It should be noted that while FIG. 2 is illustrated as a distributed system, in alternative examples, components of the vehicle 1002 may be associated with the computing device(s) 1014 and/or components of the computing device(s) 1014 may be associated with the vehicle 1002. That is, the vehicle 1002 may perform one or more of the functions associated with the computing device(s) 1014, and vice versa.

EXAMPLE CLAUSES

A: A method comprising: receiving sensor data associated with an environment from a sensor; determining that a return associated with the sensor data includes a first split return, wherein the first split return indicates two different surfaces associated with a same direction from the sensor; determining a set of split returns including the first split return and an additional split return; determining, by a machine-learned (ML) model, a first confidence score indicating that the first split return is associated with surfaces of two objects and a second confidence score indicating that the first split return is associated with particulate matter and a second surface; and controlling a vehicle based at least in part on at least one of the first confidence score or the second confidence score.

B: The method of paragraph A, wherein an output of the ML model comprises classifying the first split return as being associated with split return one or more of a hollow shape or as forming an edge.

C: The method of either paragraph A or B, further comprising: receiving an image comprising a representation of the object; segmenting the image; and determining that a segment of the image comprising the object is associated with one of the set of split returns, wherein determining that the first split return is associated with the object is further based at least in part on determining that the segment is associated with the one of the set of split returns.

D: The method of any one of paragraphs A-C, wherein determining that the first split return is associated with the object comprises determining that a density of the set of split returns within a region is less than or equal to a threshold density.

E: The method of any one of paragraphs A-D, wherein: determining the additional split return comprises determining a second split return is within a threshold distance of the first split return; and determining that the first split return is associated with a solid object is based at least in part on determining that a density of the set of split returns within a region does not meet a threshold density.

F: The method of any one of paragraphs A-E, further comprising: receiving second sensor data associated with the environment; determining that a second return associated with the second sensor data includes a second split return; determining, as a second set of split returns including the second split return, an additional split return associated with the second split return; determining, by the ML model, that the second split return is associated with particulate matter; and controlling the vehicle based at least in part on the determination that the second split return is associated with the object.

G: A non-transitory computer-readable medium storing computer-executable instructions that, when executed by one or more processors, cause the one or more processors to perform operations comprising: receiving sensor data associated with an environment from a sensor; determining that a return associated with the sensor data includes a first split return, wherein the first split return indicates two different surfaces associated with a same direction from the sensor; determining a set of split returns including the first split return and an additional split return; determining, by a machine-learned (ML) model, a first confidence score indicating that the first split return is associated with surfaces of two objects and a second confidence score indicating that the first split return is associated with particulate matter and a second surface; and controlling a vehicle based at least in part on at least one of the first confidence score or the second confidence score.

H: The system of paragraph G, wherein an output of the ML model comprises classifying the first split return as being associated with split return one or more of a hollow shape or as forming an edge.

I: The system of either paragraph G or H, wherein the operations further comprise: receiving an image comprising a representation of the object; segmenting the image; and determining that a segment of the image comprising the object is associated with one of the set of split returns, wherein determining that the first split return is associated with the object is further based at least in part on determining that the segment is associated with the one of the set of split returns.

J: The system of any one of paragraphs G-I, wherein determining that the first split return is associated with the object comprises determining that a density of the set of split returns within a region is less than or equal to a threshold density.

K: The system of any one of paragraphs G-J, wherein: determining the additional split return comprises determining a second split return is within a threshold distance of the first split return; and determining that the first split return is associated with a solid object is based at least in part on determining that a density of the set of split returns within a region does not meet a threshold density.

L: The system of any one of paragraphs G-K, wherein the operations further comprise: receiving second sensor data associated with the environment; determining that a second return associated with the second sensor data includes a second split return; determining, as a second set of split returns including the second split return, an additional split return associated with the second split return; determining, by the ML model, that the second split return is associated with particulate matter; and controlling the vehicle based at least in part on the determination that the second split return is associated with the object.

M: The system of any one of paragraphs G-L, wherein determining that the second split return is associated with particulate matter is based at least in part on at least one of: the ML model classifying the second set of split returns as a solid shape, or determining that a density of the second set of split returns within a region meets or exceeds a threshold density.

N: The system of any one of paragraphs G-M, wherein: determining the additional split return comprises determining that the additional return belongs to a same cluster, as determined by a clustering algorithm, of a centroid of the set of split returns; and determining at least one of the first confidence score or the second confidence score is based at least in part on at least one of determining a density of dual returns in a region surrounding the centroid or determining a percentage of the centroid that is surrounded by dual returns in the same cluster.

O: A non-transitory computer-readable medium storing processor-executable instructions that, when executed by the one or more processors, cause the system to perform operations comprising: receiving sensor data associated with an environment from a sensor; determining that a return associated with the sensor data includes a first split return, wherein the first split return indicates two different surfaces associated with a same direction from the sensor; determining a set of split returns including the first split return and an additional split return; determining, by a machine-learned (ML) model, that the first split return is associated with surfaces of two objects based at least in part classifying the set of split returns as or more of forming a hollow shape or as forming an edge; and controlling a vehicle based at least in part on determining that the first split return is associated with the surfaces of the two objects.

P: The non-transitory computer-readable medium of paragraph O, wherein the operations further comprise: receiving an image comprising a representation of the object; segmenting the image; and determining that a segment of the image comprising the object is associated with one of the set of split returns, wherein determining that the first split return is associated with the object is further based at least in part on determining that the segment is associated with the one of the set of split returns.

Q: The non-transitory computer-readable medium of either paragraph O or P, wherein determining that the first split return is associated with the object comprises determining that a density of the set of split returns within a region is less than or equal to a threshold density.

R: The non-transitory computer-readable medium of any one of paragraphs O-Q, wherein: determining the additional split return comprises determining a second split return is within a threshold distance of the first split return; and determining that the first split return is associated with a solid object is based at least in part on determining that a density of the set of split returns within a region does not meet a threshold density.

S: The non-transitory computer-readable medium of any one of paragraphs O-R, wherein the operations further comprise: receiving second sensor data associated with the environment; determining that a second return associated with the second sensor data includes a second split return; determining, as a second set of split returns including the second split return, an additional split return associated with the second split return; determining, by the ML model, that the second split return is associated with particulate matter; and controlling the vehicle based at least in part on the determination that the second split return is associated with the object.

T: The non-transitory computer-readable medium of any one of paragraphs O-S, wherein determining that the second split return is associated with particulate matter is based at least in part on at least one of: the ML model classifying the second set of split returns as a solid shape, or determining that a density of the second set of split returns within a region meets or exceeds a threshold density.

U: A method comprising: receiving sensor data associated with an environment; receiving an indication that a portion of the sensor data is associated with particulate matter; determining, based at least in part on at least the portion of the sensor data and by a machine-learned (ML) model, a likelihood that there is an object beyond the particulate matter; and controlling a vehicle based at least in part on the likelihood.

V: The method of paragraph V, wherein determining the likelihood is based at least in part on at least one of a transmit power of an emitter, a reflectivity of an object, or a distance to the particulate matter.

W: The method of either paragraph U or V, further comprising determining, by the ML model and based at least in part on at least the portion of the sensor data, a minimum distance to the object or a range of distances to the object based at least in part on a minimum reflectivity of the object and a minimum tolerated likelihood.

X: The method of any one of paragraphs U-W, further comprising determining a map of likelihoods based at least in part on the sensor data and the portion of the sensor data that is associated with particulate matter, wherein the map of likelihoods is a multi-dimensional data structure indicating different likelihoods at different distances, transmit powers, and reflectivities.

Y: The method of any one of paragraphs U-X, wherein determining the likelihood is further based at least in part on a density or classification of a split return in the portion of the sensor data.

Z: The method of any one of paragraphs U-Y, wherein the classification comprises an indication that the split returns form a hollow shape or a solid shape and wherein the classification is determined by a second ML model.

AA: A non-transitory computer-readable medium storing computer-executable instructions that, when executed by one or more processors, cause the one or more processors to perform operations comprising: receiving sensor data associated with an environment; receiving an indication that a portion of the sensor data is associated with particulate matter; determining, based at least in part on at least the portion of the sensor data and by a machine-learned (ML) model, a likelihood that there is an object beyond the particulate matter; and controlling a vehicle based at least in part on the likelihood.

AB: The non-transitory computer-readable medium of paragraph AA, wherein determining the likelihood is based at least in part on at least one of a transmit power of an emitter, a reflectivity of an object, or a distance to the particulate matter.

AC: The non-transitory computer-readable medium of either paragraph AA or AB, wherein the operations further comprise determining, by the ML model and based at least in part on at least the portion of the sensor data, a minimum distance to the object or a range of distances to the object based at least in part on a minimum reflectivity of the object and a minimum tolerated likelihood.

AD: The non-transitory computer-readable medium of any one of paragraphs AA-AC, wherein the operations further comprise determining a map of likelihoods based at least in part on the sensor data and the portion of the sensor data that is associated with particulate matter, wherein the map of likelihoods is a multi-dimensional data structure indicating different likelihoods at different distances, transmit powers, and reflectivities.

AE: The non-transitory computer-readable medium of any one of paragraphs AA-AD, wherein determining the likelihood is further based at least in part on a density or classification of a split return in the portion of the sensor data.

AF: The non-transitory computer-readable medium of any one of paragraphs AA-AE, wherein the classification comprises an indication that the split returns form a hollow shape or a solid shape and wherein the classification is determined by a second ML model.

AG: The non-transitory computer-readable medium of any one of paragraphs AA-AF, wherein the operations further comprise: receiving a second indication that a second portion of second sensor data is associated with second particulate matter; associating a properties of a second object with the second portion, wherein the properties include at least one of a measured distance of the second object beyond the second particulate matter from a sensor, a reflectance of the second object, or a second transmit power associated with the second sensor data; and training the ML model based at least in part a difference between an estimated output of the ML model and the properties.

AH: A system comprising: one or more processors; and a memory storing processor-executable instructions that, when executed by the one or more processors, cause the system to perform operations comprising: receiving sensor data associated with an environment; receiving an indication that a portion of the sensor data is associated with particulate matter; determining, based at least in part on at least the portion of the sensor data and by a machine-learned (ML) model, a likelihood that there is an object beyond the particulate matter; and controlling a vehicle based at least in part on the likelihood.

AI: The system of paragraph AH, wherein determining the likelihood is based at least in part on at least one of a transmit power of an emitter, a reflectivity of an object, or a distance to the particulate matter.

AJ: The system of either paragraph AH or AI, wherein the operations further comprise determining, by the ML model and based at least in part on at least the portion of the sensor data, a minimum distance to the object or a range of distances to the object based at least in part on a minimum reflectivity of the object and a minimum tolerated likelihood.

AK: The system of any one of paragraphs AH-AJ, wherein the operations further comprise determining a map of likelihoods based at least in part on the sensor data and the portion of the sensor data that is associated with particulate matter, wherein the map of likelihoods is a multi-dimensional data structure indicating different likelihoods at different distances, transmit powers, and reflectivities.

AL: The system of any one of paragraphs AH-AK, wherein determining the likelihood is further based at least in part on a density or classification of a split return in the portion of the sensor data.

AM: The system of any one of paragraphs AH-AL, wherein the classification comprises an indication that the split returns form a hollow shape or a solid shape and wherein the classification is determined by a second ML model.

AN: The system of any one of paragraphs AH-AM, wherein the operations further comprise: receiving a second indication that a second portion of second sensor data is associated with second particulate matter; associating a properties of a second object with the second portion, wherein the properties include at least one of a measured distance of the second object beyond the second particulate matter from a sensor, a reflectance of the second object, or a second transmit power associated with the second sensor data; and training the ML model based at least in part a difference between an estimated output of the ML model and the properties.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving sensor data associated with an environment;
receiving or determining an indication that a portion of the sensor data is associated with particulate matter, wherein the portion comprises a set of returns;
providing the set of returns as an input to a machine-learned (ML) model;

receiving, from the ML model, an output representing:
   a first likelihood that there is a first object with equal to or more than a first reflectivity at equal to or more than a first distance beyond the particulate matter, and
   a second likelihood that there is a second object with equal to or more than a second reflectivity at equal to or more than a second distance beyond the particulate matter; and
controlling a vehicle based at least in part on the first likelihood and the second likelihood.

2. The method of claim 1, wherein determining the first likelihood is based at least in part on at least one of a transmit power of an emitter, a reflectivity of the first object, or a distance to the particulate matter.

3. The method of claim 1, wherein determining the first likelihood comprises determining, by the ML model and based at least in part on at least the portion of the sensor data, the first distance based at least in part on the first reflectivity of the first object and the first likelihood.

4. The method of claim 1, further comprising determining a map of likelihoods based at least in part on the portion of the sensor data, wherein the first likelihood is associated with a first transmit power associated with the sensor data, and further wherein the map of likelihoods is a multi-dimensional data structure indicating the first likelihood, the second likelihood, and a third likelihood associated with a second distance, a second transmit power, and a second reflectivity.

5. The method of claim 1, wherein determining the first likelihood is further based at least in part on a classification associated with a set of split returns in the set of returns, wherein the classification is determined based on at least one of a first count or a first density associated with the set of split returns.

6. The method of claim 5, wherein:
   the classification is determined by a second ML model, and
   determining the classification comprises one of:
      determining that the set of split returns represents a hollow shape based on determining at least one of:
         that the first count falls below a count threshold, or
         that the first density falls below a density threshold, or
      determining that the set of split returns represents a solid shape based on determining at least one of:
         that the first count exceeds or equals the count threshold, or
         that the first density exceeds or equals the density threshold.

7. A non-transitory computer-readable medium storing computer-executable instructions that, when executed by one or more processors, cause the one or more processors to perform operations comprising:
   receiving sensor data associated with an environment;
   receiving or determining an indication that a portion of the sensor data is associated with particulate matter, wherein the portion comprises a set of returns, a return of the set of returns being associated with one or more of a dual return or a split return;
   providing the set of returns as an input to a machine-learned (ML) model;
   receiving, from the ML model, an output representing:
      a likelihood that there is an object with equal to or more than a first reflectivity at equal to or more than a first distance beyond the particulate matter; and
   controlling a vehicle based at least in part on the likelihood.

8. The non-transitory computer-readable medium of claim 7, wherein determining the likelihood is based at least in part on at least one of a transmit power of an emitter, a reflectivity of the object, or a distance to the particulate matter.

9. The non-transitory computer-readable medium of claim 7, wherein determining the likelihood comprises determining, by the ML model and based at least in part on at least the portion of the sensor data, the first distance based at least in part on the first reflectivity of the object and the likelihood.

10. The non-transitory computer-readable medium of claim 7, wherein the operations further comprise determining a map of likelihoods based at least in part on the portion of the sensor data, wherein the likelihood is associated with a first transmit power associated with the sensor data, and further wherein the map of likelihoods is a multi-dimensional data structure indicating the likelihood and a second likelihood associated with a second distance, a second transmit power, and a second reflectivity.

11. The non-transitory computer-readable medium of claim 7, wherein determining the likelihood is further based at least in part on a classification associated with a set of split returns in the set of returns, wherein the classification is determined based on at least one of a first count or a first density associated with the set of split returns.

12. The non-transitory computer-readable medium of claim 11, wherein:
   the classification is determined by a second ML model, and
   determining the classification comprises one of:
      determining that the set of split returns represents a hollow shape based on determining at least one of:
         that the first count falls below a count threshold, or
         that the first density falls below a density threshold, or
      determining that the set of split returns represents a solid shape based on determining at least one of:
         that the first count exceeds or equals the count threshold, or
         that the first density exceeds or equals the density threshold.

13. The non-transitory computer-readable medium of claim 7, wherein the operations further comprise:
   receiving a second indication that a second portion of second sensor data is associated with second particulate matter;
   associating a set of properties of a second object with the second portion, wherein the set of properties include at least one of a measured distance of the second object beyond the second particulate matter from a sensor, a reflectance of the second object, or a second transmit power associated with the second sensor data; and
   training the ML model based at least in part a difference between an estimated output of the ML model and the set of properties.

14. A system comprising:
   one or more processors; and
   a memory storing processor-executable instructions that, when executed by the one or more processors, cause the system to perform operations comprising:
      receiving sensor data associated with an environment;
      receiving or determining an indication that a portion of the sensor data is associated with particulate matter, wherein the portion comprises a set of returns, a return of the set of returns being associated with one or more of a dual return or a split return;

providing the set of returns as an input to a machine-learned (ML) model;

receiving, from the ML model, an output representing:
- a first likelihood that there is a first object with equal to or more than a first reflectivity at equal to or more than a first distance beyond the particulate matter, and
- a second likelihood that there is a second object with equal to or more than a second reflectivity at equal to or more than a second distance beyond the particulate matter; and controlling a vehicle based at least in part on the first likelihood and the second likelihood.

15. The system of claim 14, wherein determining the first likelihood is based at least in part on at least one of a transmit power of an emitter, a reflectivity of the first object, or a distance to the particulate matter.

16. The system of claim 14, wherein determining the first likelihood comprises determining, by the ML model and based at least in part on at least the portion of the sensor data, the first distance based at least in part on the first reflectivity of the first object and the first likelihood.

17. The system of claim 14, wherein the operations further comprise determining a map of likelihoods based at least in part on the portion of the sensor data, wherein the first likelihood is associated with a first transmit power associated with the sensor data, and further wherein the map of likelihoods is a multi-dimensional data structure indicating the first likelihood, the second likelihood, and a third likelihood associated with a second distance, a second transmit power, and a second reflectivity.

18. The system of claim 14, wherein determining the first likelihood is further based at least in part on a classification associated with a set of split returns in the set of returns, wherein the classification is determined based on at least one of a first count or a first density associated with the set of split returns.

19. The system of claim 18, wherein:
- the classification is determined by a second ML model, and
- determining the classification comprises one of:
  - determining that the set of split returns represents a hollow shape based on determining at least one of:
    - that the first count falls below a count threshold, or
    - that the first density falls below a density threshold, or
  - determining that the set of split returns represents a solid shape based on determining at least one of:
    - that the first count exceeds or equals the count threshold, or
    - that the first density exceeds or equals the density threshold.

20. The method of claim 1, further comprising determining the indication, and wherein determining the indication comprises:
- determining that the set of returns are associated with a solid shape; and
- determining that the set of returns represent the particulate matter based on determining that the set of returns are associated with the solid shape.

* * * * *